United States Patent
Nam

(10) Patent No.: US 10,792,911 B2
(45) Date of Patent: *Oct. 6, 2020

(54) NONRESTRICTIVE DRIVE-TYPE MARKING SYSTEM AND MARKING METHOD THEREOF

(71) Applicant: Han Seok Nam, Seoul (KR)

(72) Inventor: Han Seok Nam, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,861

(22) Filed: Feb. 26, 2019

(65) Prior Publication Data

US 2019/0184697 A1    Jun. 20, 2019

Related U.S. Application Data

(63) Continuation of application No. 15/672,419, filed on Aug. 9, 2017, now Pat. No. 10,293,598, which is a
(Continued)

(30) Foreign Application Priority Data

Feb. 12, 2015    (KR) .......................... 10-2015-0021828

(51) Int. Cl.
*B41F 27/00* (2006.01)
*B41J 3/407* (2006.01)
(Continued)

(52) U.S. Cl.
CPC ............. *B41F 27/005* (2013.01); *B41J 3/407* (2013.01); *B43K 8/006* (2013.01); *G01C 15/02* (2013.01);
(Continued)

(58) Field of Classification Search
CPC ... G06F 3/12; G06F 3/0317; B41J 2/12; B41J 23/00; B41J 2/165; B41J 11/20;
(Continued)

(56) References Cited

U.S. PATENT DOCUMENTS 2,480,208 A    8/1949    Alvarez
6,023,537 A    2/2000    Wada et al.
(Continued)

FOREIGN PATENT DOCUMENTS

EP    1034935 A1    9/2000
JP    1996-110229 A    4/1996
(Continued)

OTHER PUBLICATIONS

Cesare Rossi, Research Article "A Robotic System to Scan and Reproduce Object", Hindawi Publishing Corporation, Journal of Robotics, Dec. 13, 2011, 11pages, Naples, Italy.
(Continued)

*Primary Examiner* — David H Banh
(74) *Attorney, Agent, or Firm* — Novick, Kim & Lee, PLLC; Jae Youn Kim

(57) ABSTRACT

In order to allow a worker to accurately and repeatedly mark an original plan on a working surface, provided is a nonrestrictive drive-type marking system including a nonrestrictive drive-type marking device, the nonrestrictive drive-type marking system including an input unit configured to receive data of content to be marked; a marking unit configured to mark the content corresponding to the data on a working surface; a driving unit configured to allow at least a part of the nonrestrictive drive-type marking device comprising the marking unit to nonrestrictively move on the working surface; a position detecting unit configured to sense position information of the nonrestrictive drive-type marking device; and a control unit electrically connected to the input unit, the marking unit, the driving unit, and the position detecting unit, and configured to calculate a current position of the at least the part of the nonrestrictive drive-type marking device comprising the marking unit by comparing the position information with the data, to compare the current position
(Continued)

with the data, and if the current position does not match with the data and a degree of mismatch thereof is within a preset range, to move at least a part of the marking unit, and to control the nonrestrictive drive-type marking device to mark the content corresponding to the data on the working surface while the nonrestrictive drive-type marking device moves.

20 Claims, 12 Drawing Sheets

Related U.S. Application Data continuation of application No. PCT/KR2016/001376, filed on Feb. 11, 2016.

(51) Int. Cl.
*G01C 15/02* (2006.01)
*B43K 8/00* (2006.01)
*G02B 6/00* (2006.01)
*G06F 3/03* (2006.01)

(52) U.S. Cl.
CPC .... *G02B 2006/0098* (2013.01); *G06F 3/0317* (2013.01)

(58) Field of Classification Search
CPC .... B41J 29/38; B41J 3/407; F24J 2/40; B41F 27/005; G02B 2006/0098
See application file for complete search history.

(56) References Cited

U.S. PATENT DOCUMENTS

| | | |
|---|---|---|
| 6,666,857 B2 | 12/2003 | Smith |
| 8,733,877 B2 | 5/2014 | Inoue |
| 10,365,101 B2 | 7/2019 | Nam et al. |
| 2005/0025554 A1 | 2/2005 | Inaba |
| 2006/0280358 A1 | 12/2006 | Ishikawa |
| 2008/0212120 A1* | 9/2008 | Mealy ............... H04N 1/032 358/1.12 |
| 2008/0262719 A1* | 10/2008 | Bledsoe ............... B41J 3/36 701/408 |
| 2009/0060283 A1* | 3/2009 | Bledsoe ............... B41J 3/36 382/107 |
| 2009/0314414 A1* | 12/2009 | Verschuuren ........ B82Y 10/00 156/64 |
| 2011/0141175 A1 | 6/2011 | Murray et al. |
| 2011/0178669 A1 | 7/2011 | Tanaka et al. |
| 2011/0267340 A1 | 11/2011 | Kraus et al. |
| 2013/0187970 A1 | 7/2013 | Inoue |
| 2016/0318182 A1 | 11/2016 | Nakaya et al. |

FOREIGN PATENT DOCUMENTS

| | | |
|---|---|---|
| JP | 2003-515210 A | 4/2003 |
| JP | 2007-021613 A | 2/2007 |
| JP | 2013-147003 A | 8/2013 |
| KR | 10-2008-0029679 A | 4/2008 |
| KR | 10-2010-0045585 A | 5/2010 |
| WO | 01/37060 A1 | 5/2001 |
| WO | 2015/002351 A1 | 1/2015 |

OTHER PUBLICATIONS

Tom Duckett, Mobile robot self-localisation using occupancy histograms and a mixture of Gaussian location hypotheses, Robotics and Autonomous Systems, 2011, 13 pages.

Sebastian Thrun, "A Real-Time Algorithm for Mobile Robot Mapping With Applications to Multi-Robot and 3D Mapping" IEEE International Conference on Robotics and Automation, Apr. 2000, 8 pages.

* cited by examiner

NONRESTRICTIVE DRIVE-TYPE MARKING SYSTEM AND MARKING METHOD THEREOF

CROSS-REFERENCE TO RELATED APPLICATIONS

The instant application is a continuation application of U.S. application Ser. No. 15/672,419 filed on Aug. 9, 2017, which is a continuation application of international application No. PCT/KR2016/001376 filed on Feb. 11, 2016, which claims priority to Korean patent application No. 10-2015-0021828 filed on Feb. 12, 2015, and the entire disclosures of the aforementioned applications are hereby incorporated by reference.

TECHNICAL FIELD

The present disclosure relates to a nonrestrictive drive-type marking system and a marking method thereof, and more particularly, to a nonrestrictive drive-type marking system arranged to mark a nonrestrictive area while moving, and a marking method thereof.

BACKGROUND ART

During construction such as in building and/or engineering works, a builder directly measures a site by analyzing scaled drawings and then the construction proceeds accordingly.

Such a construction scheme requires the builder to correctly analyze drawings. However, in an actual construction site, unprofessional workers may manually measure and set a construction position such that a constructional error may occur.

Limits and/or problems between drawings and actual analysis occur not only in building and/or engineering works but also occur in a general case of marking particular content on a working surface. That is, in order to mark the particular content such as an advertisement on the working surface, a worker has to see a drawing of an original plan and manually mark it on the working surface, meaning that all works depend on the proficiency of the worker. In this case, accuracy deteriorates and if the same content is repeatedly marked, a problem gets worse. Such a problem may occur not only in the construction field but also in other fields such as heavy industry, city planning, and the like which require marking according to position measurement.

DETAILED DESCRIPTION OF THE INVENTION

Technical Problem

In order to solve limits and/or problems of the related art, the present disclosure provides a nonrestrictive drive-type marking system and a marking method thereof so that a worker can accurately and repeatedly mark original data on a working surface.

Technical Solution

According to an aspect of the present disclosure, there is provided a nonrestrictive drive-type marking system including a nonrestrictive drive-type marking device, the nonrestrictive drive-type marking system including an input unit configured to receive data of content to be marked; a marking unit configured to mark the content corresponding to the data on a working surface; a driving unit configured to allow at least a part of the nonrestrictive drive-type marking device including the marking unit to nonrestrictively move on the working surface; a position detecting unit configured to sense position information of the nonrestrictive drive-type marking device; and a control unit electrically connected to the input unit, the marking unit, the driving unit, and the position detecting unit, and configured to calculate a current position of the at least the part of the nonrestrictive drive-type marking device including the marking unit by comparing the position information with the data, to compare the current position with the data, and if the current position does not match with the data and a degree of mismatch thereof is within a preset range, to move at least a part of the marking unit, and to control the nonrestrictive drive-type marking device to mark the content corresponding to the data on the working surface while the nonrestrictive drive-type marking device moves.

The driving unit may include a first driving unit configured to move the at least the part of the nonrestrictive drive-type marking device; and a second driving unit configured to move the at least the part of the marking unit.

The control unit may be further configured to move the at least the part of the nonrestrictive drive-type marking device by driving the first driving unit, and if the current position does not match with the data and the degree of mismatch thereof is within the preset range, to move the at least the part of the marking unit by driving the second driving unit.

The marking unit may include a first marking unit configured to mark the content corresponding to the data on at least a portion of the working surface.

The marking unit may include an ink supplying unit configured to supply ink; and a nozzle unit connected to the ink supplying unit and configured to spray the ink onto a marking target point.

The nozzle unit may include a first nozzle unit configured to perform marking in a first direction; and a second nozzle unit configured to perform marking in a second direction different from the first direction, wherein each of the first nozzle unit and the second nozzle unit includes one or more nozzles.

The marking unit may include a second marking unit configured to project the content corresponding to the data onto a portion of the working surface.

The marking unit may include a light irradiating unit configured to generate light; and an optical system connected to the light irradiating unit and configured to transmit the light to be irradiated to a marking target point.

The optical system may include a first optical element used for marking in a first direction; and a second optical element used for marking in a second direction different from the first direction, wherein each of the first optical element and the second optical element includes one or more optical elements.

The marking unit may include a photosensitive agent supplying unit configured to supply a photosensitive agent; a spraying unit connected to the photosensitive agent supplying unit and configured to discharge the photosensitive agent to a marking target point; a light irradiating unit configured to generate light; and an optical system connected to the light irradiating unit, corresponding to the spraying unit, and configured to transmit the light to be irradiated to the marking target point.

The spraying unit may include a first spraying unit configured to perform marking in a first direction; and a second spraying unit configured to perform marking in a second direction different from the first direction, and wherein the optical system may include a first optical element used for marking in the first direction; and a second optical element used for marking in the second direction, wherein each of the first spraying unit and the second spraying unit may include one or more spraying units, and each of the first optical element and the second optical element may include one or more optical elements.

The nonrestrictive drive-type marking device may include at least the marking unit, the driving unit, and the position detecting unit, and a remote control device includes the input unit, wherein the control unit may include a first control unit electrically connected to the marking unit, the driving unit, and the position detecting unit and positioned in the nonrestrictive drive-type marking device, and a second control unit electrically connected to the input unit and positioned in the remote control device, and the nonrestrictive drive-type marking device and the remote control device are enabled to communicate with each other.

The nonrestrictive drive-type marking device may include the marking unit, the driving unit, the position detecting unit, the input unit, and the control unit.

According to another aspect of the present disclosure, there is provided a nonrestrictive drive-type marking method including inputting data of content to be marked into a nonrestrictive drive-type marking device including at least a sensing unit, a position detecting unit, a driving unit, and a marking unit; sensing, by the position detecting unit, position information of the nonrestrictive drive-type marking device; recognizing, by a control unit, a current position of at least a part of the nonrestrictive drive-type marking device by comparing the position information with the data, wherein the control unit is electrically connected to the position detecting unit; by the control unit, comparing the current position with the data, and if the current position matches with a marking start point of the data, controlling operations of the driving unit and the marking unit to move the nonrestrictive drive-type marking device and to mark the content corresponding to the data on a working surface from the marking start point; and if the current position does not match with the marking start point of the data and a degree of mismatch thereof is within a preset range, moving, by the control unit, at least a part of the marking unit.

The sensing, by the position detecting unit, of the position information may include generating, by the position detecting unit, a first position signal with respect to the at least the part of the marking unit, the recognizing, by the control unit, of the current position of the at least the part of the nonrestrictive drive-type marking device may include recognizing, by the control unit, a first current position based on the first position signal, the comparing, by the control unit, of the current position with the data may include comparing, by the control unit, the first current position with a first marking start point, if the first current position matches with the first marking start point, the controlling of the operations may include controlling the marking to be performed, and if the first current position does not match with the first marking start point, the controlling of the operations may include moving, by the control unit, the at least the part of the marking unit to the first marking start point, and the first marking start point may be a marking target point to be marked by the marking unit.

If the first current position does not match with the first marking start point, the nonrestrictive drive-type marking method may further include calculating, by the control unit, a degree of mismatch between the first current position and the first marking start point; and comparing, by the control unit, the degree of mismatch with the preset range, and wherein the nonrestrictive drive-type marking method may further include, if the degree of mismatch is within the preset range, moving, by the control unit, the at least the part of the marking unit to the first marking start point, and if the degree of mismatch exceeds the preset range, moving, by the control unit, the nonrestrictive drive-type marking device to the first marking start point.

The sensing, by the position detecting unit, of the position information may include generating a second position signal with respect to at least a part of the nonrestrictive drive-type marking device which is not the marking unit, the recognizing, by the control unit, of the current position of the at least the part of the nonrestrictive drive-type marking device may include, by the control unit, calculating a second current position based on the second position signal and calculating a first current position based on the second current position, wherein the first current position may be the current position of the at least the part of the marking unit, the comparing, by the control unit, of the current position with the data may include comparing, by the control unit, the second current position with a second marking start point, the controlling of the operations may include controlling, by the control unit, operations of the driving unit and the marking unit to mark the content corresponding to the data on the working surface if the second current position matches with the second marking start point, and moving, by the control unit, the at least the part of the marking unit to a first marking start point if the second current position does not match with the second marking start point, and the first marking start point may be a marking target point to be marked by the marking unit, and the second marking start point may be a marking start point that is not the marking target point.

If the second current position does not match with the second marking start point, the nonrestrictive drive-type marking method may further include calculating, by the control unit, a degree of mismatch between the second current position and the second marking start point; and comparing, by the control unit, the degree of mismatch with the preset range, wherein, if the degree of mismatch is within the preset range, the control unit may move the at least the part of the marking unit to the first marking start point, and if the degree of mismatch exceeds the preset range, the control unit may move the nonrestrictive drive-type marking device to the second marking start point.

The nonrestrictive drive-type marking method may further include ending, by the control unit, the marking at a marking end point.

The ending of the marking may include ending, by the control unit, the marking if the current position matches with the marking end point, and the nonrestrictive drive-type marking method may further include, if the current position does not match with the marking end point, determining, by the control unit, whether a degree of mismatch between the current position and the marking end point is within a preset range; if the degree of mismatch is within the preset range, moving, by the control unit, the marking unit to the marking end point; and if the degree of mismatch exceeds the preset range, not moving, by the control unit, the marking unit to the marking end point.

The not moving, by the control unit, of the marking unit to the marking end point may include ending, by the control unit, the marking if the degree of mismatch is acceptable; and ending, by the control unit, the marking in an error state if the degree of mismatch is unacceptable.

The nonrestrictive drive-type marking method may further include performing, by the control unit, a simulation on the content to be marked by the nonrestrictive drive-type marking device while moving on the working surface.

Advantageous Effects

According to embodiments of the present disclosure, a worker may accurately mark original data on a working surface.

According to embodiments of the present disclosure, original data may be accurately marked regardless of a position of a working surface.

According to embodiments of the present disclosure, original data may be accurately marked on a working surface while avoiding obstructions.

According to embodiments of the present disclosure, marking of same content may be repeated.

In addition, according to embodiments of the present disclosure, original data may be projected onto a working surface so that accuracy of work may be further increased.

MODE OF THE INVENTION

Figure 1:
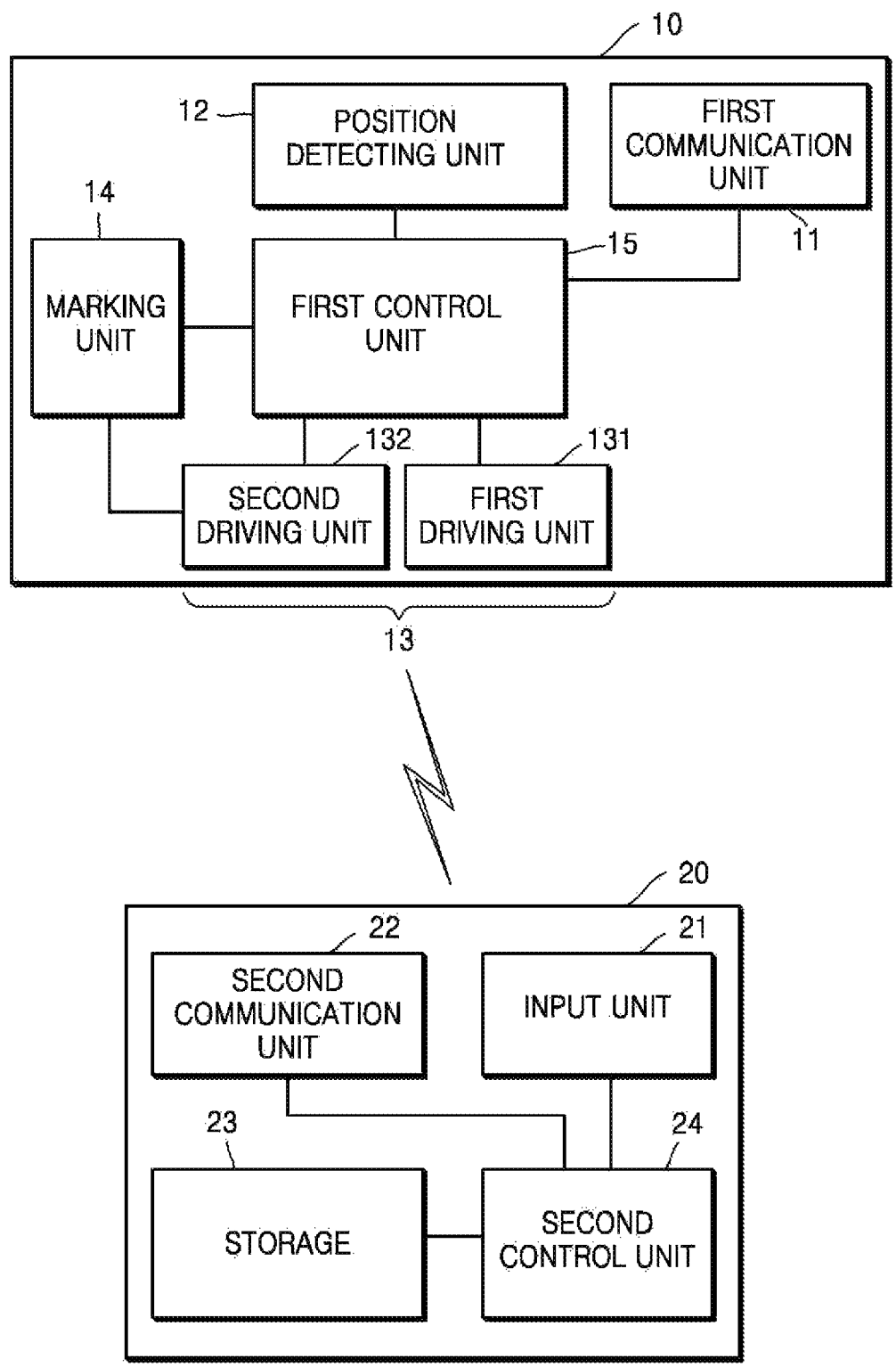
FIG. 1 is a configuration diagram of a nonrestrictive drive-type marking system, according to an embodiment of the present disclosure.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

The embodiments of the present disclosure will be described below in more detail with reference to the accompanying drawings. Those components that are the same or are in correspondence are rendered the same reference numeral regardless of the figure number, and redundant explanations are omitted.

FIG. 1 is a configuration diagram of a nonrestrictive drive-type marking system, according to an embodiment of the present disclosure.

Referring to FIG. 1, the nonrestrictive drive-type marking system according to the embodiment of the present disclosure includes a nonrestrictive drive-type marking device 10 and a remote control device 20.

The nonrestrictive drive-type marking device 10 includes a first communication unit 11 for communicating with a second communication unit 22 of the remote control device 20, a position detecting unit 12 for sensing position information of the nonrestrictive drive-type marking device 10, a driving unit 13 for driving the nonrestrictive drive-type marking device 10, a marking unit 14 for marking content, which corresponds to data, on a working surface, and a first control unit 15 for controlling operations of the first communication unit 11, the position detecting unit 12, the driving unit 13, and the marking unit 14.

The working surface may indicate a surface in a predetermined space and on which marking is to be performed, and may include a first working surface on which the nonrestrictive drive-type marking device 10 is movable, a second working surface making a predetermined angle with respect to the first working surface, and a third working surface making a predetermined angle with respect to the second working surface. The first working surface may include a floor surface. The second working surface may include a wall surface and a corner of the second working surface may be formed so as to be in contact with the first working surface but is not limited thereto. The third working surface may include a ceiling and a corner of the third working surface may not be formed so as to be in contact with the first working surface but may be formed so as to be in contact with the second working surface but is not limited thereto. A top of the working surface may be even or uneven but is not limited thereto.

The remote control device 20 includes an input unit 21 for inputting data, the second communication unit 22 for communicating with the first communication unit 11 of the nonrestrictive drive-type marking device 10, a storage 23 for storing the data, and a second control unit 24 for controlling operations of the input unit 21, the second communication unit 22, and the storage 23.

The input unit 21 is a unit for inputting data of content to be marked by a user. The input unit 21 may be, but is not limited to, an external memory or any other input device arranged for the user to directly input data. The input unit 21 may be connected to a separate transmitting and receiving unit (not shown), and the separate transmitting and receiving unit (not shown) may include a wired and/or wireless transmitting and receiving unit, may receive data of content to be marked from an external device, and may store the data in the storage 23.

The storage 23 stores the data and then transmits the data to the second control unit 24, thereby allowing the second control unit 24 to generate a marking signal. Alternatively, although not illustrated in drawings, the nonrestrictive drive-type marking device 10 may be connected to an external storage device such as a universal serial bus (USB), and may generate a marking signal based on data of content to be marked which is provided from the external storage device.

The second communication unit 22 is configured to communicate with the first communication unit 11. The marking signal generated by the second control unit 24 may be transmitted to the first communication unit 11 via the second communication unit 22. The first control unit 15 allows marking to be performed by delivering, to the marking unit 14, the marking signal received by the first communication unit 11. Although not illustrated in drawings, the nonrestrictive drive-type marking device 10 may include a separate storage (not shown) and thus may store data such as the marking signal received from the remote control device 20.

As will be described below, the second control unit 24 may receive, via the first communication unit 11 and the second communication unit 22, measurement data including data about a current position which is measured by the nonrestrictive drive-type marking device 10. The second control unit 24 may determine whether to perform marking and/or to move by comparing the measurement data with original data, may generate a marking signal and/or a movement signal accordingly, and then may transmit the marking signal and/or the movement signal to the nonrestrictive drive-type marking device 10 via the second communication unit 22 and the first communication unit 11. The original data may be one-dimensional data information, two-dimensional data information, and/or three-dimensional data information, which was previously generated.

The second control unit 24 may display, on the original data, information about a difference and/or an error between the measurement data and the original data. The second control unit 24 may store the original data having the difference and/or the error displayed thereon in the storage 23.

The remote control device 20 according to the embodiment of the present disclosure may transmit a command involving marking and/or moving to the nonrestrictive drive-type marking device 10, may apply feedback to the original data based on the measurement data received from the nonrestrictive drive-type marking device 10, and may transmit a command to make the nonrestrictive drive-type marking device 10 perform a simulation step.

Figure 2:
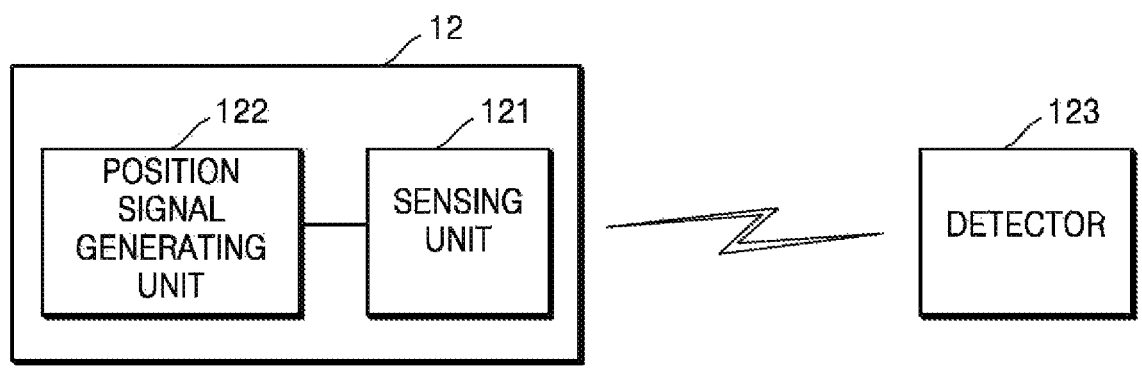
FIG. 2 is a configuration diagram of an example of a position detecting unit of FIG. 1, FIGS. 3A and 3B are configuration diagrams of an example of a marking unit of FIG. 1.

FIG. 2 is a configuration diagram of an example of a position detecting unit of FIG. 1.

Referring to FIG. 2, the position detecting unit 12 according to the embodiment of the present disclosure includes a sensing unit 121 and a position signal generating unit 122.

The position detecting unit 12 recognizes a current position of the nonrestrictive drive-type marking device 10, senses information about a working surface, and transmits position data to the first control unit 15. The current position of the nonrestrictive drive-type marking device 10 may be, but is not limited to, a current position of at least a part of the marking unit 14, or a current position of at least a part of the nonrestrictive drive-type marking device 10 which is not the marking unit 14.

Hereinafter, the current position of at least a part of the marking unit 14, and the current position of at least a part of the nonrestrictive drive-type marking device 10 which is not the marking unit 14 are respectively defined as a first current position and a second current position. According to an embodiment, the first current position indicates a current position of a part to which a marking is performed by the marking unit 14, and the second current position indicates a current position of a part (e.g., a center part) of the nonrestrictive drive-type marking device 10 which is not the marking unit 14. However, if there is no need to distinguish between the first current position and the second current position, a current position of the nonrestrictive drive-type marking device 10 indicates a current position of at least a part of the nonrestrictive drive-type marking device 10 including the marking unit 14.

The sensing unit 121 senses a detector 123 positioned on a working surface and having various forms. For example, the sensing unit 121 may include a distance measurement sensor that uses a light wave, a radio wave, a sound wave, or an image, or an image measurement sensor that uses an image. As another example, the sensing unit 121 may include a global positioning system (GPS) receiving unit for receiving a GPS signal.

The sensing unit 121 is electrically connected to the position signal generating unit 122, and the position signal generating unit 122 generates a position signal based on information sensed by the sensing unit 121 and then transmits the position signal to the first control unit 15. The position signal may be transmitted to the second control unit 24 via the first control unit 15, and the first control unit 15 and/or the second control unit 24 may calculate a current position in the original data, based on the position signal.

For example, the position signal generating unit 122 may generate a first position signal based on position information about at least the part of the marking unit 14, and the first current position may be calculated based on the first position signal.

As another example, the position signal generating unit 122 may generate a second position signal based on position information about at least the part of the nonrestrictive drive-type marking device 10 which is not the marking unit 14, and the second current position may be calculated based on the second position signal. The first current position may be calculated by adding a distance between the second current position and the marking unit 14 to the second current position, but the present disclosure is not limited thereto.

Although not illustrated in drawings, the position detecting unit 12 according to another embodiment of the present disclosure includes an image-capturing unit (not shown) and an image signal generating unit (not shown).

The image-capturing unit (not shown) may include a camera unit such as a charge-coupled device (CCD) camera, and captures an image of the working surface.

The image signal generating unit (not shown) is electrically connected to the image-capturing unit (not shown), and generates an image signal based on the image captured by the image-capturing unit (not shown). The image signal may be transmitted to the first control unit 15 and/or the second control unit 24, and the first control unit 15 and/or the second control unit 24 may calculate and/or check a current position in the original data, based on the image signal.

The position detecting unit 12 may detect a position of the nonrestrictive drive-type marking device 10 in a marking start step, and may also detect a current position of the nonrestrictive drive-type marking device 10 while a marking is being performed. While the marking is being performed, the position detecting unit 12 periodically or aperiodically detects a current position of the nonrestrictive drive-type marking device 10 so that the nonrestrictive drive-type marking device 10 may check whether an error occurs on the marking. The marking start step may include not only a case of initially starting the marking but may also include a case of restarting the marking after the marking is stopped, and the present disclosure is not limited thereto.

Referring back to FIG. 1, the driving unit 13 is arranged to allow at least a part of the nonrestrictive drive-type marking device 10 to nonrestrictively move on the working surface or along the working surface.

The driving unit 13 may include a first driving unit 131 and a second driving unit 132.

Any driving means can be applied as the first driving unit 131 to move the nonrestrictive drive-type marking device 10. For example, the first driving unit 131 may include a motor and a wheel, and the motor and the wheel may be connected to a separate rotation axis to enable a change in a direction of the nonrestrictive drive-type marking device 10. As another example, a means such as a caterpillar which is capable of moving on an uneven land may be used as the first driving unit 131. As another example, the first driving unit 131 may include a plurality of robot arms to allow the nonrestrictive drive-type marking device 10 to move due to the robot arms. As another example, the first driving unit 131 may include a propeller to allow the nonrestrictive drive-type marking device 10 to fly in a working space including the working surface.

The second driving unit 132 is configured to move the marking unit 14 and is electrically connected to the first control unit 15. For example, the second driving unit 132 may include a cylinder, an actuator, and/or a motor. The second driving unit 132 may further include a device such as an encoder capable of measuring a movement distance of the marking unit 14, and accordingly, as will be described below, the second driving unit 132 may measure a distance in which the marking unit 14 is spaced apart from the part of the nonrestrictive drive-type marking device 10 which is not the marking unit 14.

The marking unit 14 is configured to mark content corresponding to data on the working surface, and is electrically connected to the first control unit 15. Any unit such as ink, a photosensitive agent, light, a sound wave, or the like which can mark the content may be applied as the marking unit 14.

The marking unit 14 may mark at least one of one-dimensional data and two-dimensional data on the working surface, or may mark three-dimensional data in the working space including the working surface. For example, the marking unit 14 may mark the three-dimensional data in a stacked form by performing the marking one or more times on the marked working surface, but the present disclosure is not limited thereto. Hereinafter, an embodiment in which the two-dimensional data is marked on the working surface will be mainly described.

Figure 3A:
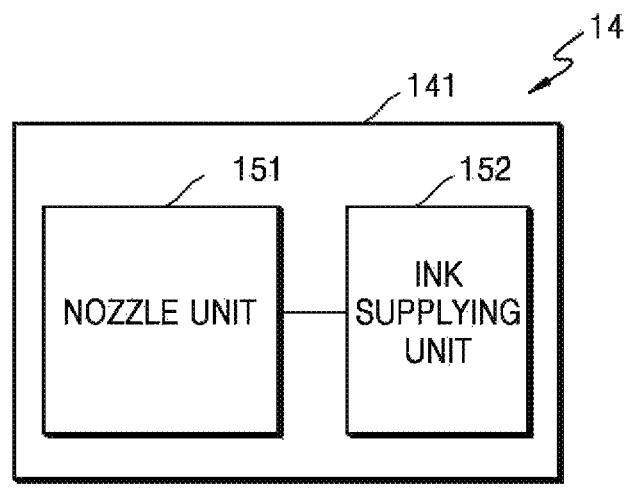
Figure 3B:
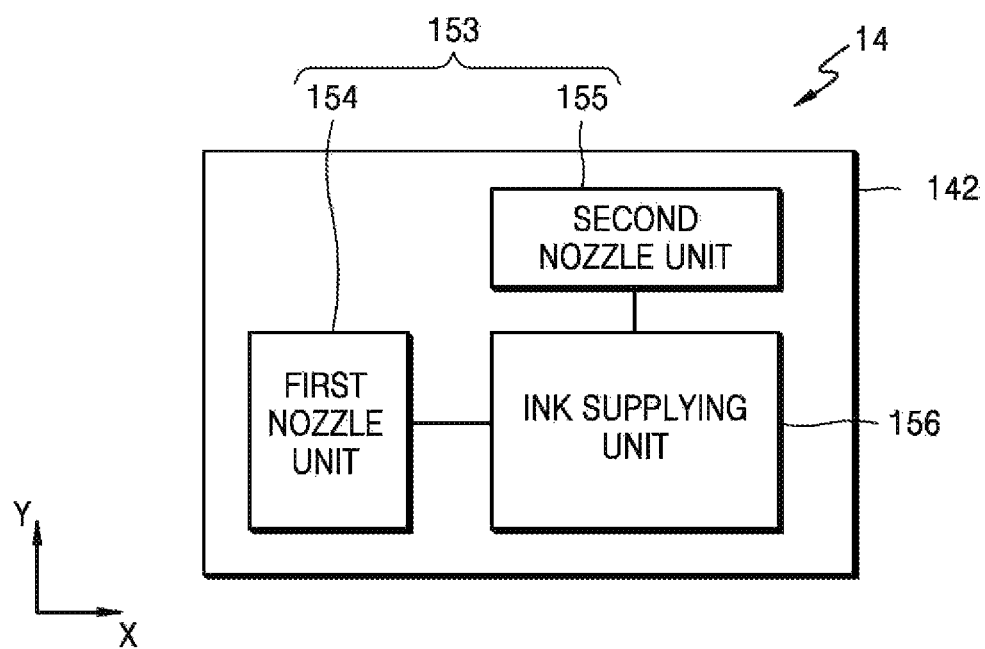

FIGS. 3A and 3B are configuration diagrams of an example of the marking unit 14 of FIG. 1, in which the marking unit 14 may include a first marking unit 141 or 142.

Referring to FIG. 3A, the first marking unit 141 is configured to mark content corresponding to data on a working surface. The first marking unit 141 according to the embodiment of the present disclosure includes a nozzle unit 151 for discharging ink, and an ink supplying unit 152 for storing and supplying ink.

The nozzle unit 151 may include a nozzle head (not shown) for making the ink discharged, and a head driving unit (not shown) for withdrawing, inserting, or changing a direction of the nozzle head (not shown). A current position of the first marking unit 141 may indicate a current position of the nozzle unit 151.

The ink supplying unit 152 may include at least one ink storage tank, and may further include a pump unit and a valve unit which are connected to the nozzle unit 151 so as to transport ink to the nozzle unit 151.

Referring to FIG. 3B, the first marking unit 142 according to another embodiment of the present disclosure may include a nozzle unit 153 and an ink supplying unit 156, and the nozzle unit 153 includes a first nozzle unit 154 for performing a marking in an X-axis direction, and a second nozzle unit 155 for performing a marking in an Y-axis direction. The first nozzle unit 154 and the second nozzle unit 155 are connected to the ink supplying unit 156. Each of the first nozzle unit 154 and the second nozzle unit 155 may include one or more nozzles. In this regard, the X-axis direction may indicate a representative direction of a first direction, and the Y-axis direction may indicate a representative direction of a second direction that is different from the first direction, but the present disclosure is not limited thereto. The same is applied to an X-axis direction and a Y-axis direction which are to be described below.

The first marking unit 141 or 142 is not limited to spraying a liquid-type pigment such as ink, and thus may spray a solid-type pigment or a gel-type pigment, but the present disclosure is not limited thereto.

The first marking unit 141 or 142 may directly apply the liquid-type pigment such as ink or the gel-type pigment such as a paste to the working surface by using a pen-type unit or a brush-type unit, or may directly apply the solid-type pigment to the working surface, and the present disclosure is not limited thereto.

In addition, the first marking unit 141 or 142 may be configured to make the marking performed on the working surface by applying a physical change to the working surface. For example, the first marking unit 141 or 142 may be configured to make the marking performed by applying a scratch to a top of the working surface.

Figure 4:
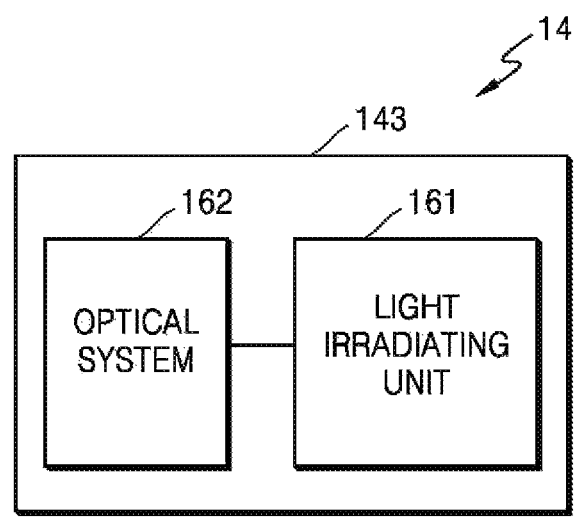
FIG. 4 is a configuration diagram of another example of the marking unit of FIG. 1.

FIG. 4 is a configuration diagram of another example of the marking unit 14 of FIG. 1 which may include a second marking unit 143.

Referring to FIG. 4, the second marking unit 143 is configured to project content corresponding to data on a working surface. The second marking unit 143 according to the other embodiment of the present disclosure includes a light irradiating unit 161 for irradiating light, and an optical system 162 through which the irradiated light passes. The light may be, but is not limited to, highly straight light such as a laser, or a display image corresponding to data to be marked.

Although not illustrated in drawings, the optical system 162 of the second marking unit 143 according to the other embodiment of the present disclosure may include a first optical element (not shown) used for a marking in an X-axis direction, and a second optical element (not shown) used for a marking in a Y-axis direction. The first optical element (not shown) and the second optical element (not shown) may be connected to the light irradiating unit 161. Each of the first optical element (not shown) and the second optical element (not shown) may include one or more optical elements.

Figure 5:
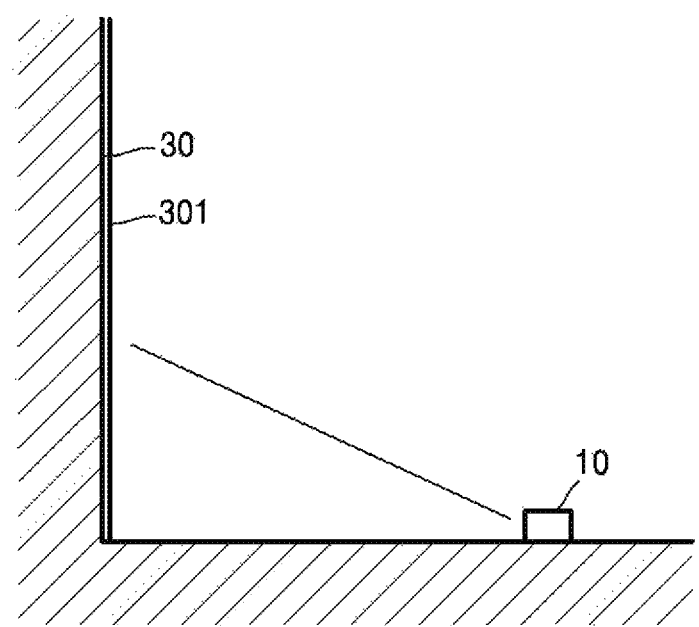
FIG. 5 is a diagram for describing an operation of a marking unit of FIG. 4.

FIG. 5 is a diagram for describing an operation of a marking unit of FIG. 4. Hereinafter, when the nonrestrictive drive-type marking device 10 performs a marking while directly moving only on a first working surface, an operation of the second marking unit 143 will now be representatively described.

Referring to FIG. 5, when a working surface 30 is at least one of places including the second working surface and the third working surface in which the nonrestrictive drive-type marking device 10 including only a motor and a wheel cannot directly move thereon, the second marking unit 143 may perform a marking by irradiating highly straight light such as a laser to the working surface 30.

When a predetermined pigment 301 is previously applied onto the working surface 30, the predetermined pigment 301 may be discolored and/or deformed in response to the light irradiated from the second marking unit 143 according to another embodiment of the present disclosure. The pigment 301 may be colorless or colored. That is, even if the nonrestrictive drive-type marking device 10 cannot perform the marking while directly moving on the working surface 30, the nonrestrictive drive-type marking device 10 may mark content corresponding to data by irradiating the light to the working surface 30 while the nonrestrictive drive-type marking device 10 moves along the working surface 30 on which the predetermined pigment 301 is applied.

If the predetermined pigment 301 is not previously applied onto the working surface 30, the second marking unit 143 according to the other embodiment of the present disclosure may irradiate light to the working surface 30 so as to allow a worker to manually perform the marking.

If the predetermined pigment 301 is not previously applied onto the working surface 30, the second marking unit 143 according to the other embodiment of the present disclosure may irradiate, to the working surface 30, a display image corresponding to marking-target data such as a predetermined design drawing. In this regard, the nonrestrictive drive-type marking device 10 may move to a preset location and may project a drawing image onto the working surface 30.

Based on the image projected onto the working surface 30 by the second marking unit 143, the worker may accurately check positions and forms of various types of electric apparatuses, electronic apparatuses, construction equipment, and parts, e.g., windows and doors, signboards, tiles, or the like which would be arranged on the working surface 30, so that accuracy of a work may be further increased.

When the position detecting unit 12 measures a distance of a working surface, the second marking unit 143 according to the other embodiment of the present disclosure may irradiate, to the working surface 30, an image to which a user-desired scale is applied based on a value of the measured distance. In this regard, the second marking unit 143 may irradiate an image, in consideration of a gradient of the working surface 30.

The second marking unit 143 according to the other embodiment of the present disclosure may split the original data so as to allow the nonrestrictive drive-type marking device 10 to sequentially project a split image onto the second working surface or the third working surface while the nonrestrictive drive-type marking device 10 moves on the first working surface, so that work efficiency may be improved.

In the embodiments of the present disclosure described with reference to FIGS. 4 and 5, the second driving unit 132 may adjust an angle of light irradiation by the second marking unit 143, and may include the actuator that is connected to the optical system 162 and is capable of adjusting a focal length, but the present disclosure is not limited thereto.

Figure 6:
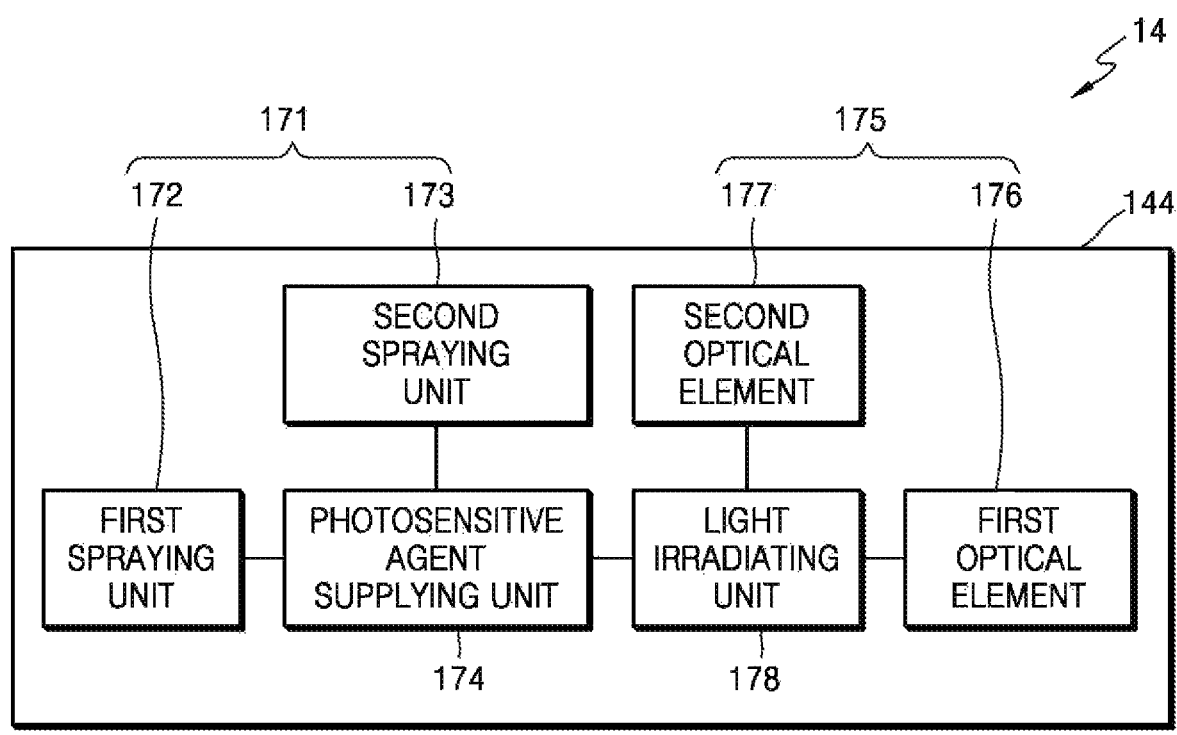
FIG. 6 is a configuration diagram of another example of the marking unit of FIG. 1.

FIG. 6 is a configuration diagram of another example of the marking unit 14 of FIG. 1 which may include a third marking unit 144.

Referring to FIG. 6, the third marking unit 144 is configured to mark content corresponding to data on a working surface. The third marking unit 144 according to the embodiment of the present disclosure includes a spraying unit 171 for discharging a photosensitive agent, a photosensitive agent supplying unit 174, a light irradiating unit 178 for irradiating light, and an optical system 175 through which the irradiated light passes.

The spraying unit 171 may include a spray head (not shown) for making the photosensitive agent discharged, and a spray driving unit (not shown) for withdrawing, inserting, or changing a direction of the spray head (not shown). A current position of the third marking unit 144 may indicate a current position of the spraying unit 171.

The spraying unit 171 may include, but is not limited to, a plurality of spraying units. For example, the spraying unit 171 according to the embodiment of the present disclosure may include a first spraying unit 172 for performing a marking in an X-axis direction, and a second spraying unit 173 for performing a marking in a Y-axis direction. The first spraying unit 172 and the second spraying unit 173 may be connected to the photosensitive agent supplying unit 174. Each of the first spraying unit 172 and the second spraying unit 173 may include one or more spraying units.

The photosensitive agent supplying unit 174 may include at least one photosensitive agent storage tank, and may further include a pump unit and a valve unit which are connected to the spraying unit 171 so as to transport a photosensitive agent to the spraying unit 171. The photosensitive agent may include a material that is discolored and/or deformed in response to light. The photosensitive agent may include not only a liquid-type photosensitive agent but may also include a solid-type photosensitive agent or a gel-type photosensitive agent, and the present disclosure is not limited thereto.

The spraying unit 171 may directly apply the liquid-type photosensitive agent or the gel-type photosensitive agent to the working surface by using a pen-type unit or a brush-type unit, or may directly apply the solid-type photosensitive agent to the working surface, and the present disclosure is not limited thereto.

The light irradiating unit 178 irradiates light to react with the photosensitive agent.

The optical system 175 may include a first optical element 176 used for a marking in an X-axis direction, and a second optical element 177 used for a marking in a Y-axis direction. The first optical element 176 and the second optical element 177 may be connected to the light irradiating unit 178. Each of the first optical element 176 and the second optical element 177 may include one or more optical elements. The light irradiating unit 178 may include a first light irradiating unit (not shown) connected to the first optical element 176, and a second light irradiating unit (not shown) connected to the second optical element 177.

The spraying unit 171 corresponds to the optical system 175. The first spraying unit 172 may correspond to the first optical element 176, and the second spraying unit 173 may correspond to the second optical element 177. For example, three spraying units included in the first spraying unit 172 may respectively correspond to three optical elements included in the first optical element 176. As another example, two spraying units included in the second spraying unit 173 may respectively correspond to two optical elements included in the second optical element 177. A position to which light is irradiated through the optical system 175 may be equal to a position to which the spraying unit 171 corresponding to the optical system 175 sprays the photosensitive agent, but the present disclosure is not limited thereto.

The first control unit 15 may control an operation of the light irradiating unit 178 so that light may be irradiated by the optical system 175 after the spraying unit 171 sprays the photosensitive agent. The third marking unit 144 may spray the photosensitive agent by using the spraying unit 171 by the control of the first control unit 15, and may irradiate, by using the optical system 175, light to a position to which the photosensitive agent is sprayed, thereby performing a marking on the working surface. For example, after the third marking unit 144 sprays the photosensitive agent by using the first spraying unit 172, the third marking unit 144 may irradiate the light by using the first optical element 176 corresponding to the first spraying unit 172, thereby performing the marking on the working surface.

The nonrestrictive drive-type marking device 10 according to the embodiment of the present disclosure includes the third marking unit 144, so that the nonrestrictive drive-type marking device 10 may accurately perform the marking even if a distance between the working surface and the marking unit 14 is not constant.

Figure 7:
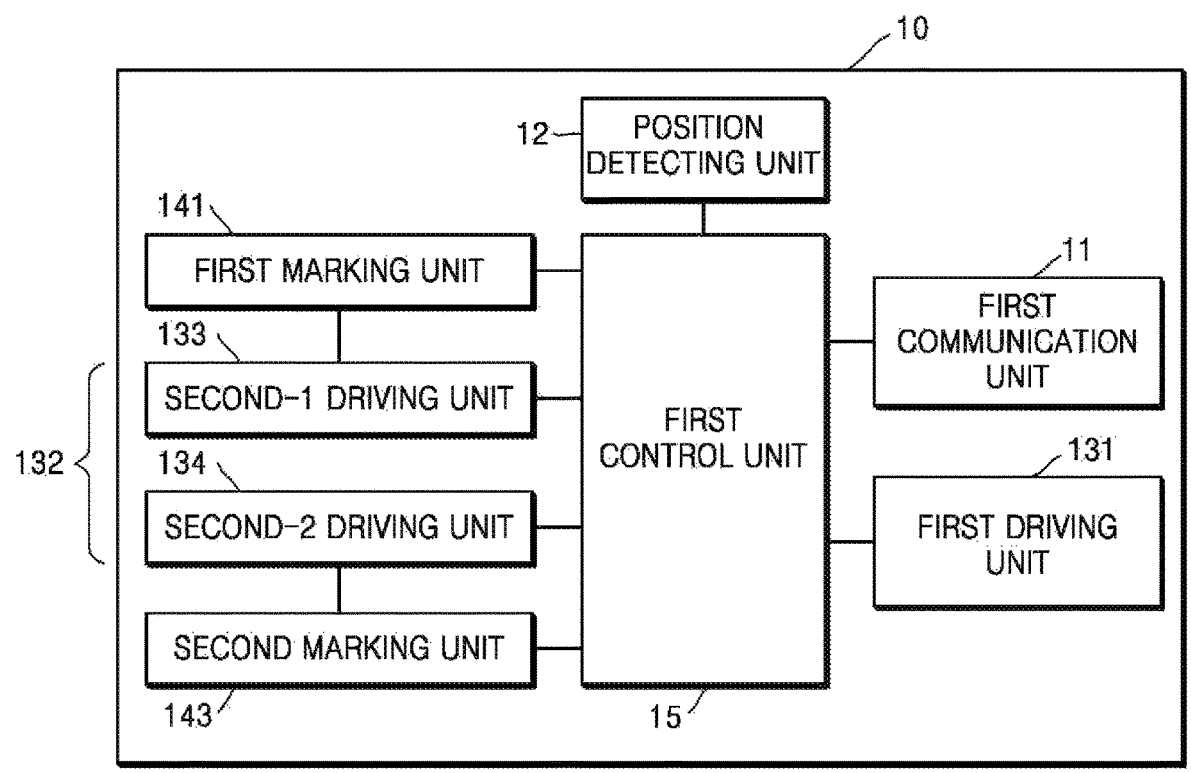
FIG. 7 is a configuration diagram of a nonrestrictive drive-type marking system, according to another embodiment of the present disclosure.

FIG. 7 is a configuration diagram of a nonrestrictive drive-type marking system, according to another embodiment of the present disclosure.

Referring to FIG. 7, the nonrestrictive drive-type marking system according to the embodiment of the present disclosure includes the nonrestrictive drive-type marking device 10.

The nonrestrictive drive-type marking device 10 illustrated in FIG. 7 may include both the first marking unit 141 and the second marking unit 143, and in this regard, a second-1 driving unit 133 is connected to the first marking unit 141 and thus drives the first marking unit 141, and a second-2 driving unit 134 is connected to the second marking unit 143 and thus drives the second marking unit 143. The first marking unit 141 or 142 illustrated in FIG. 3A or 3B may be applied as the first marking unit 141 illustrated in FIG. 7. However, the present disclosure is not limited thereto, and the third marking unit 144 illustrated in FIG. 6 may be applied instead of the first marking unit 141. Other elements are equal to those illustrated in FIG. 1, thus, detailed descriptions thereof are omitted here.

According to the embodiment of the present disclosure, the nonrestrictive drive-type marking device 10 may simultaneously perform a marking operation on a first working surface, a second working surface, and a third working surface, or may separately perform a marking operation on one or more working surfaces of the first working surface, the second working surface, and the third working surface.

Although not illustrated in drawings, the nonrestrictive drive-type marking device 10 may further include a power supply unit (not shown). The power supply unit (not shown) may include at least one of a chargeable battery and a power supplier that is connected in a wireless or wired manner. The power supply unit (not shown) may receive a power from an electric generator but the present disclosure is not limited thereto.

Figure 8:
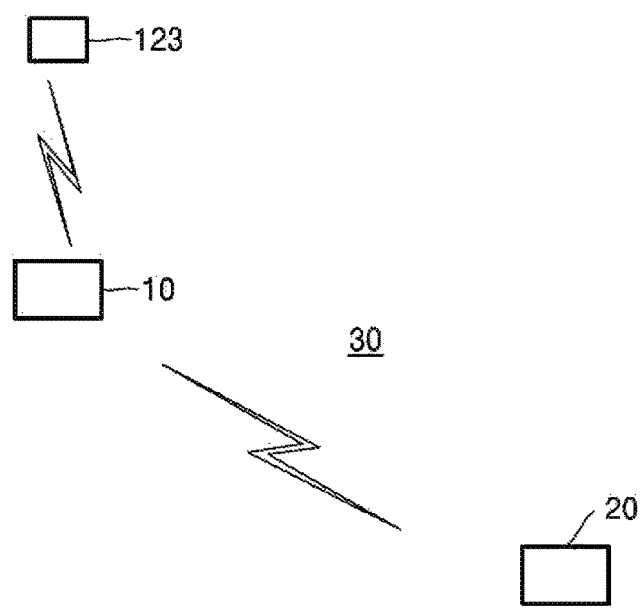
FIG. 8 is a configuration diagram of an example in which the nonrestrictive drive-type marking system of FIG. 1 is arranged.

FIG. 8 is a configuration diagram of an example in which the nonrestrictive drive-type marking system of FIG. 1 is arranged.

Referring to FIG. 8, the nonrestrictive drive-type marking system is arranged in a working space including the working surface 30. The detector 123 may be placed in the working space. The nonrestrictive drive-type marking device 10 may recognize the detector 123, thereby detecting a current position on the working surface 30. The remote control device 20 may be positioned in the outside of the working surface 30. A fixed terminal such as a computer and/or a mobile terminal such as a smartphone, a smart pad, or the like may be used as the remote control device 20, but the present disclosure is not limited thereto.

When the nonrestrictive drive-type marking system is arranged as described above, marking may be performed.

Hereinafter, with reference to FIGS. 9 and 10, a marking method by the nonrestrictive drive-type marking system according to an embodiment of the present disclosure will now be described.

Figure 9:
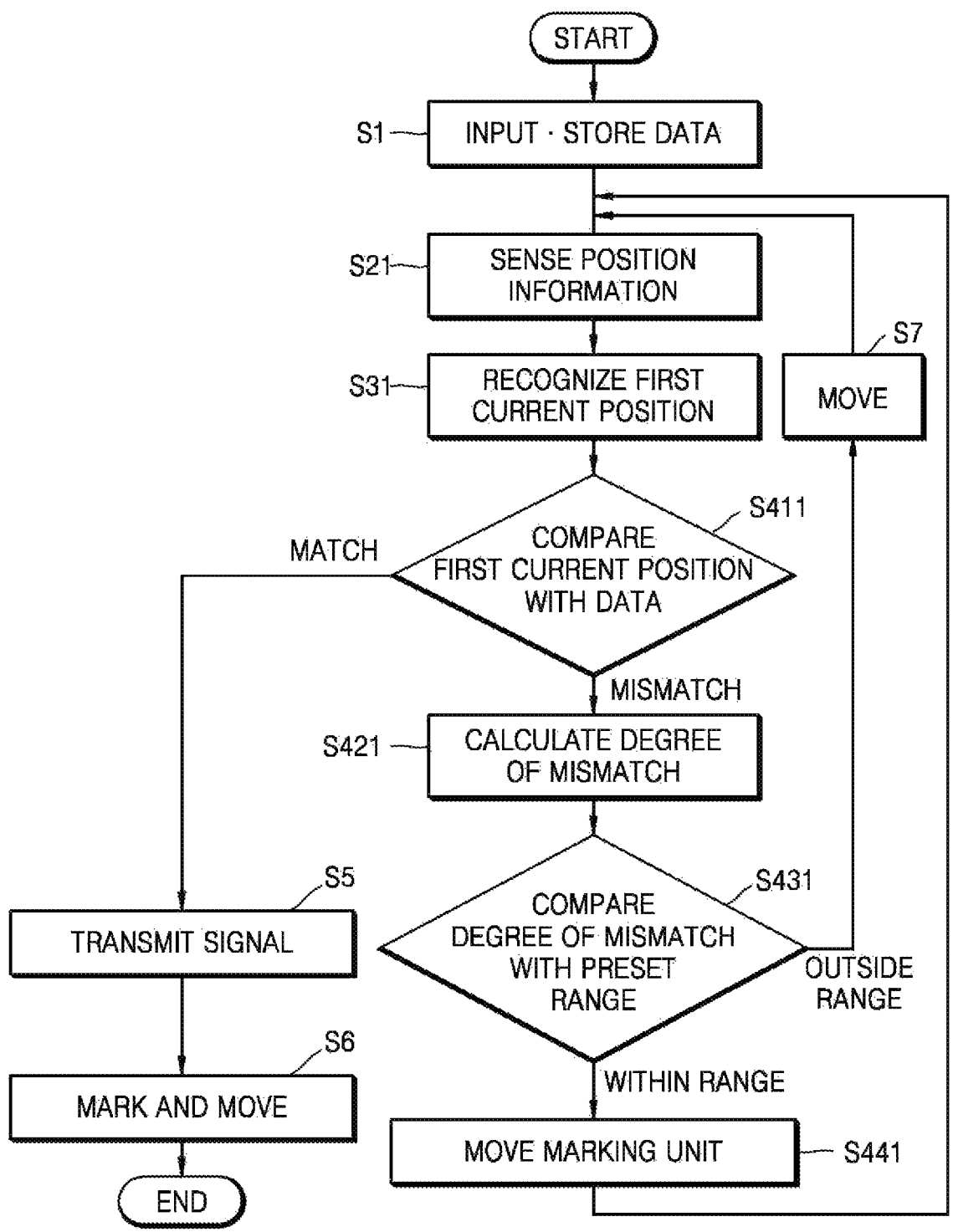
FIG. 9 is a block diagram illustrating an embodiment of a marking method performed by the nonrestrictive drive-type marking system of FIG. 1.

FIG. 9 is a block diagram illustrating an embodiment of a marking method performed by the nonrestrictive drive-type marking system of FIG. 1. FIG. 10 is a diagram for describing a current position of the nonrestrictive drive-type marking device 10.

Referring to FIGS. 1 and 9, the remote control device 20 stores, in the storage 23, data of content to be marked which is input via the input unit 21 (S1). The second control unit 24 generates a marking signal based on the data received via the input unit 21. The marking signal includes the data of content to be marked.

Next, when the position detecting unit 12 of the nonrestrictive drive-type marking device 10 senses position information (S21), the first control unit 15 of the nonrestrictive drive-type marking device 10 and/or the second control unit 24 of the remote control device 20 recognizes a first current position from the position information (S31). Hereinafter, with reference to FIG. 11, the recognizing of a position in FIG. 9 will now be described in detail.

Figure 11:
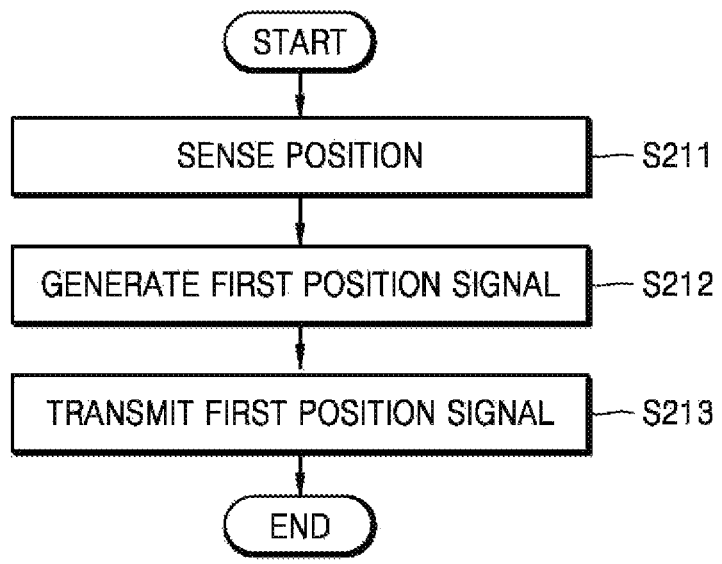
FIG. 11 is a block diagram illustrating a particular example of recognizing a position in FIG. 9.

FIG. 11 is a block diagram illustrating a particular example of the recognizing of a position in FIG. 9.

According to an embodiment of the present disclosure, as illustrated in FIG. 11, after the sensing unit 121 senses a position of the detector 123 (S211), the position signal generating unit 122 generates a first position signal based on the position (S212).

The first position signal is transmitted to the first control unit 15 and is transmitted to the second control unit 24 via the first communication unit 11 and the second communication unit 22 (S213). That is, the sensing unit 121 may exactly sense a position of a part of the marking unit 14 which performs a marking, and accordingly, the position signal generating unit 122 may generate the first position signal.

Referring back to FIG. 9, the first control unit 15 and/or the second control unit 24 may calculate a first current position P1 (refer to FIG. 10) based on the first position signal and may recognize the first current position P1 (S31). The first current position P1 (refer to FIG. 10) may be the position of the part of the marking unit 14 which performs a marking.

Although not illustrated in drawings, when the position detecting unit 12 includes the image-capturing unit (not shown) and the image signal generating unit (not shown), an image of a work site is captured by the image-capturing unit (not shown), and the image signal generating unit (not shown) generates an image signal based on the image. The image signal is transmitted to the first control unit 15 and is transmitted to the second control unit 24 via the first communication unit 11 and the second communication unit 22. The second control unit 24 may recognize the first current position P1 (refer to FIG. 10) of the nonrestrictive drive-type marking device 10 by using a transmitted position signal or the transmitted image signal, based on the input data.

The first control unit 15 and/or the second control unit 24 compares the first current position with original data (S411).

For example, the second control unit 24 may determine whether the first current position P1 (refer to FIG. 10) matches with a marking start point. The marking start point is a first reference point at which the nonrestrictive drive-type marking device 10 starts a marking. That is, the marking start point may be the first reference point indicating a start of a marking on a certain section from among a whole marking section to be marked by the nonrestrictive drive-type marking system. Thus, a plurality of sequential first reference points may be provided to the whole marking section.

According to the embodiment of the present disclosure, the marking start point may be a marking target point. The marking target point may indicate a point of a working surface on which a marking is performed by the marking unit 14. For example, as illustrated in FIG. 3A, when the marking unit 14 corresponds to the first marking unit 141 including the nozzle unit 151 and the ink supplying unit 152, the marking target point may indicate the point of the working surface to which ink is sprayed from the nozzle unit 151.

According to another embodiment of the present disclosure, the marking start point may be different from a marking target point. For example, the marking start point may be a point at which the part of the nonrestrictive drive-type marking device 10 which is not the marking unit 14 is positioned to start a marking. In this regard, the marking target point may indicate a point at which the nozzle unit 151 is positioned, i.e., the point at which ink is to be sprayed.

Hereinafter, the marking start point that is the marking target point, and the marking start point that is not the marking target point are distinguished therebetween by being referred to as a first marking start point and a second marking start point.

If the first current position P1 (refer to FIG. 10) matches with a first marking start point S1 (refer to FIG. 10), the first control unit 15 and/or the second control unit 24 transmits a marking signal including data of content to be marked to the nonrestrictive drive-type marking device 10 (S5) so that the nonrestrictive drive-type marking device 10 performs a marking while moving (S6).

For example, if the first current position P1 (refer to FIG. 10) matches with the first marking start point S1 (refer to FIG. 10), the first control unit 15 and/or the second control unit 24 may drive the driving unit 13 and the marking unit 14, thereby allowing the nonrestrictive drive-type marking device 10 to perform the marking while moving.

If the first current position P1 (refer to FIG. 10) does not match with the first marking start point S1 (refer to FIG. 10), the first control unit 15 and/or the second control unit 24 calculates a degree of mismatch (S421), and determines whether the calculated degree of mismatch is within a preset range A (refer to FIG. 10) (S431).

Figure 10:
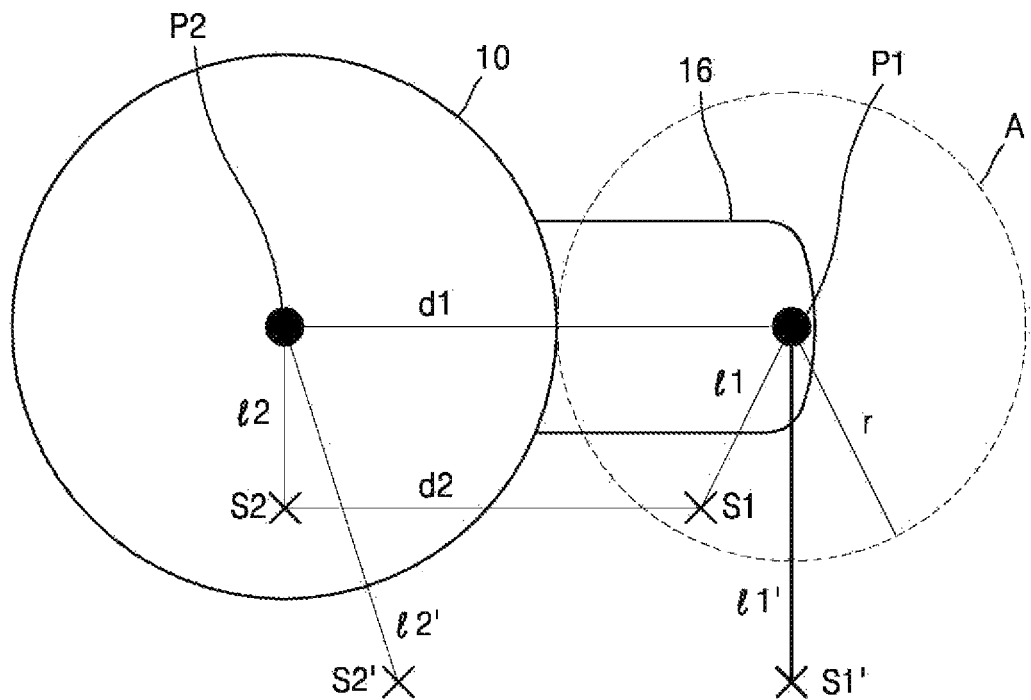
FIG. 10 is a diagram illustrating an embodiment of a nonrestrictive drive-type marking device.

The preset range A (refer to FIG. 10) indicates a range in which the marking unit 14 and/or the nonrestrictive drive-type marking device 10 can be moved by the driving unit 13 so as to match the first current position P1 (refer to FIG. 10) of the marking unit 14 with the first marking start point S1 (refer to FIG. 10). For example, the preset range A (refer to FIG. 10) may be a circle of which radius is r.

If the degree of mismatch is within the preset range A (refer to FIG. 10), the first control unit 15 and/or the second control unit 24 moves at least a part of the marking unit 14 to the first marking start point S1 (refer to FIG. 10) (S441).

Afterward, when the aforementioned position recognition processes S21, S31, and S411 are performed and thus the first current position P1 (refer to FIG. 10) matches with the first marking start point S1 (refer to FIG. 10), the second control unit 24 transmits a marking signal including the data of content to be marked to the nonrestrictive drive-type marking device 10 (S5) so as to allow the nonrestrictive drive-type marking device 10 to perform the marking while moving (S6).

According to the other embodiment of the present disclosure, if the degree of mismatch is within the preset range A (refer to FIG. 10), the first control unit 15 and/or the second control unit 24 may move at least a part of the marking unit 14 to the first marking start point S1 (refer to FIG. 10) by the degree of mismatch, and then may perform the marking through S5 and S6, but the present disclosure is not limited thereto.

If the degree of mismatch exceeds the preset range A (refer to FIG. 10), the first control unit 15 and/or the second control unit 24 moves the nonrestrictive drive-type marking device 10 (S7).

The first control unit 15 and/or the second control unit 24 moves the nonrestrictive drive-type marking device 10 until the degree of mismatch becomes within the preset range A (refer to FIG. 10), and then repeats the aforementioned processes S21, S31, S411, S421, and S431. Afterward, if it is confirmed that the first current position P1 (refer to FIG. 10) matches with the first marking start point S1 (refer to FIG. 10), the second control unit 24 may perform the marking according to the processes S5 and S6.

For example, as in FIG. 10, in the case where a distance l1 between the first current position P1 and the first marking start point S1 is less than r, and thus it is determined that the degree of mismatch is within the preset range A, the first control unit 15 and/or the second control unit 24 may control an operation of the second driving unit 132 to move the marking unit 14 so as to allow the first current position P1 to match with the first marking start point S1, and then may perform a marking operation.

As another example, as in FIG. 10, in the case where a distance l1' between a first marking start point S1' and the first current position P1 is greater than r, and thus the degree of mismatch exceeds the preset range A, the first control unit 15 and/or the second control unit 24 may control an operation of the first driving unit 131 and/or the second driving unit 132 to move the nonrestrictive drive-type marking device 10 so as to allow the distance between the first marking start point S1' and the first current position P1 to be within the preset range A, and then to move the marking unit 14 so as to allow the first current position P1 to match with the first marking start point S1', and then may perform the marking.

Figure 12:
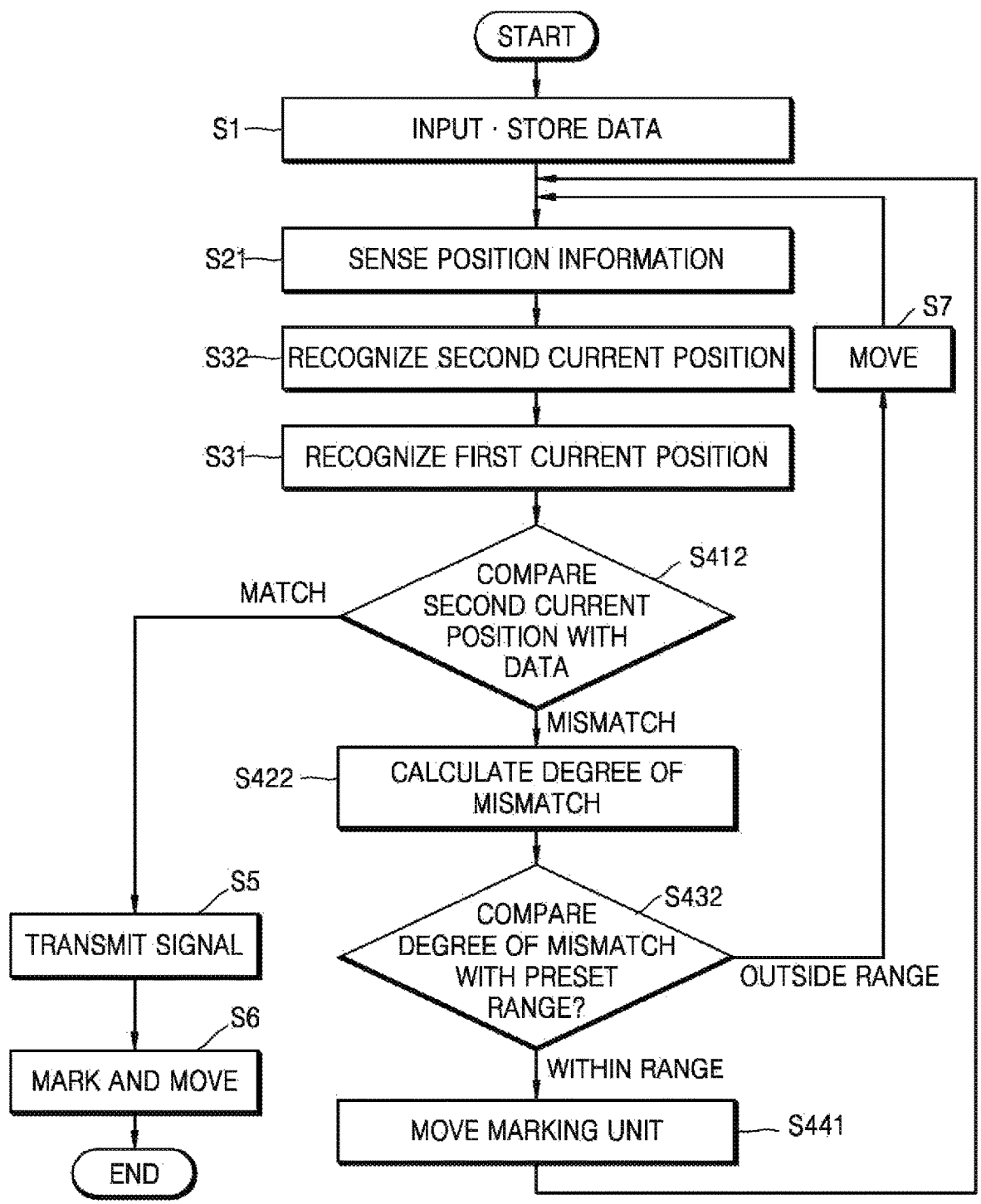
FIG. 12 is a block diagram illustrating another embodiment of the marking method performed by the nonrestrictive drive-type marking device of FIG. 1.

FIG. 12 is a block diagram illustrating another embodiment of the marking method performed by the nonrestrictive drive-type marking device of FIG. 1. Hereinafter, descriptions that are equal to those described with reference to FIG. 9 are briefly provided or are omitted.

Referring to FIGS. 1 and 12, the remote control device 20 stores, in the storage 23, data of content to be marked which is input via the input unit 21 (S1).

The second control unit 24 generates a marking signal based on the data received via the input unit 21. Next, when the position detecting unit 12 of the nonrestrictive drive-type marking device 10 senses position information (S21), the first control unit 15 of the nonrestrictive drive-type marking device 10 and/or the second control unit 24 of the remote control device 20 recognizes a second current position from the position information (S32). Hereinafter, with reference to FIG. 13, the recognizing of a position in FIG. 12 will now be described in detail.

Figure 13:
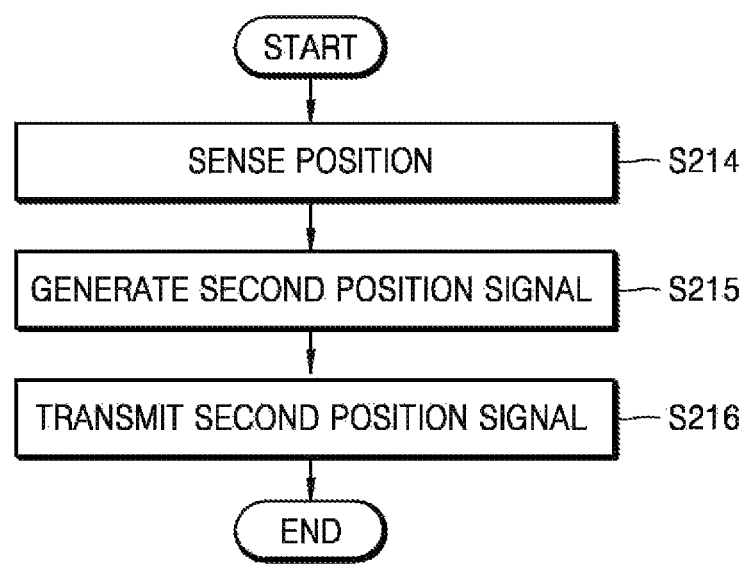
FIG. 13 is a block diagram illustrating another particular example of the recognizing of a position in FIG. 9.

FIG. 13 is a block diagram illustrating another particular example of the recognizing of a position in FIG. 9.

According to an embodiment of the present disclosure, as illustrated in FIG. 13, the sensing unit 121 senses a position of the detector 123 (S214), and the position signal generating unit 122 generates a second position signal based on the position (S215).

The second position signal is transmitted to the first control unit 15 and is transmitted to the second control unit 24 via the first communication unit 11 and the second communication unit 22 (S216). That is, the sensing unit 121 may sense a position of the part of the nonrestrictive drive-type marking device 10 which is not the marking unit 14, and accordingly, the position signal generating unit 122 may generate the second position signal.

The first control unit 15 and/or the second control unit 24 may calculate a second current position P2 (refer to FIG. 10) based on the second position signal. Since the first control unit 15 and/or the second control unit 24 previously recognizes information about a first distance d1 (refer to FIG. 10) between the first current position P1 (refer to FIG. 10) and the second current position P2 (refer to FIG. 10), the first control unit 15 and/or the second control unit 24 may calculate and recognize the first current position P1 (refer to FIG. 10) by adding the information about the first distance d1 (refer to FIG. 10) to the second current position P2 (refer to FIG. 10) (S31). Referring to FIG. 10, the second current position P2 may be a position of the part (e.g., a center part) of the nonrestrictive drive-type marking device 10 which is not the marking unit 14.

Although not illustrated in drawings, when the position detecting unit 12 includes the image-capturing unit (not shown) and the image signal generating unit (not shown), an image of a work site is captured by the image-capturing unit (not shown), and the image signal generating unit (not shown) generates an image signal based on the image. The image signal is transmitted to the first control unit 15 and is transmitted to the second control unit 24 via the first communication unit 11 and the second communication unit 22. The second control unit 24 may recognize the second current position P2 (refer to FIG. 10) of the nonrestrictive drive-type marking device 10 by using a transmitted position signal or the transmitted image signal, based on the input data. Then, the first control unit 15 and/or the second control unit 24 previously recognizes the information about the first distance d1 (refer to FIG. 10) between the first current position P1 (refer to FIG. 10) and the second current position P2 (refer to FIG. 10), so that the first control unit 15 and/or the second control unit 24 may calculate and recognize the first current position P1 (refer to FIG. 10) by adding the information about the first distance d1 (refer to FIG. 10) to the second current position P2 (refer to FIG. 10).

Referring back to FIG. 12, the first control unit 15 and/or the second control unit 24 compares the second current position with original data (S412).

For example, the second control unit 24 may determine whether the second current position P2 (refer to FIG. 10) matches with a second marking start point S2 (refer to FIG. 10).

If the second current position P2 (refer to FIG. 10) matches with the second marking start point S2 (refer to FIG. 10), the second control unit 24 transmits a marking signal including data of content to be marked to the nonrestrictive drive-type marking device 10 (S5) so that the nonrestrictive drive-type marking device 10 performs a marking while moving (S6).

In this regard, the first control unit 15 and/or the second control unit 24 already has information about a second distance d2 (refer to FIG. 10) between the first marking start point S1 (refer to FIG. 10) and the second marking start point S2 (refer to FIG. 10), and the second distance d2 (refer to FIG. 10) may be changed.

Whenever the second distance d2 is changed, the first control unit 15 and/or the second control unit 24 may control the second driving unit 132 to move the marking unit 14 so as to allow the first current position P1 (refer to FIG. 10) of the marking unit 14 to match with the first marking start point S1 (refer to FIG. 10), thereby making the marking unit 14 perform a marking. That is, the first control unit 15 and/or the second control unit 24 may adjust the first distance d1 (refer to FIG. 10) between the first current position P1 (refer to FIG. 10) and the second current position P2 (refer to FIG. 10) so as to make the first distance d1 match with the second distance d2 (refer to FIG. 10) that is a variable distance, and may control the second driving unit 132 to move the marking unit 14 so as to adjust the first distance d1 (refer to FIG. 10) between the first current position P1 (refer to FIG. 10) and the second current position P2 (refer to FIG. 10).

The second marking start point S2 (refer to FIG. 10) may be set to be a random position spaced apart from the first marking start point S1 (refer to FIG. 10) by the second distance d2 (refer to FIG. 10).

If the second current position P2 (refer to FIG. 10) does not match with the second marking start point S2 (refer to FIG. 10), the first control unit 15 and/or the second control unit 24 calculates a degree of mismatch (S422), and determines whether the calculated degree of mismatch is within the preset range A (refer to FIG. 10) (S431).

If the degree of mismatch is within the preset range A (refer to FIG. 10), the first control unit 15 and/or the second control unit 24 moves at least a part of the marking unit 14 to the first marking start point S1 (refer to FIG. 10) (S441).

Afterward, when the aforementioned position recognition processes S21, S32, S31, and S412 are performed and thus the second current position P2 (refer to FIG. 10) matches with the second marking start point S2 (refer to FIG. 10), the second control unit 24 transmits a marking signal including the data of content to be marked to the nonrestrictive drive-type marking device 10 (S5) so as to allow the nonrestrictive drive-type marking device 10 to perform the marking while moving (S6).

If the degree of mismatch exceeds the preset range A (refer to FIG. 10), the first control unit 15 and/or the second control unit 24 moves the nonrestrictive drive-type marking device 10 (S7).

The first control unit 15 and/or the second control unit 24 moves the nonrestrictive drive-type marking device 10 until the degree of mismatch becomes within the preset range A (refer to FIG. 10), and then repeats the aforementioned processes S21, S32, S31, S412, S422, and S432. Afterward, if it is confirmed that the second current position P2 (refer to FIG. 10) matches with the second marking start point S2 (refer to FIG. 10), the first control unit 15 and/or the second control unit 24 may perform the marking according to the processes S5 and S6.

For example, as in FIG. 10, if a distance 12 between the second current position P2 and the second marking start point S2 is less than r, the first control unit 15 and/or the second control unit 24 may control an operation of the second driving unit 132 to move the marking unit 14 so as to allow the first current position P1 to match with the first marking start point S1, and then may perform a marking operation.

As another example, as in FIG. 10, if a distance 12' between a second marking start point S2' and the second current position P2 is greater than r, the first control unit 15 and/or the second control unit 24 may control an operation of the first driving unit 131 and/or the second driving unit 132 to move the nonrestrictive drive-type marking device 10 so as to allow the distance between the second marking start point S2' and the second current position P2 to be within the preset range A, and then to move the marking unit 14 so as to allow the first current position P1 to match with the first marking start point S1', and then may perform the marking.

By repeating the aforementioned processes, the nonrestrictive drive-type marking system according to the embodiments of the present disclosure may detect a marking start point and may mark content corresponding to input data on a working surface.

Although not illustrated in drawings, even if a current position does not match with the marking start point, when a degree of mismatch is within a preset error range, the second control unit 24 may transmit a marking signal including data of content to be marked to the nonrestrictive drive-type marking device 10, thereby allowing the nonrestrictive drive-type marking device 10 to perform a marking while moving.

Figure 14:
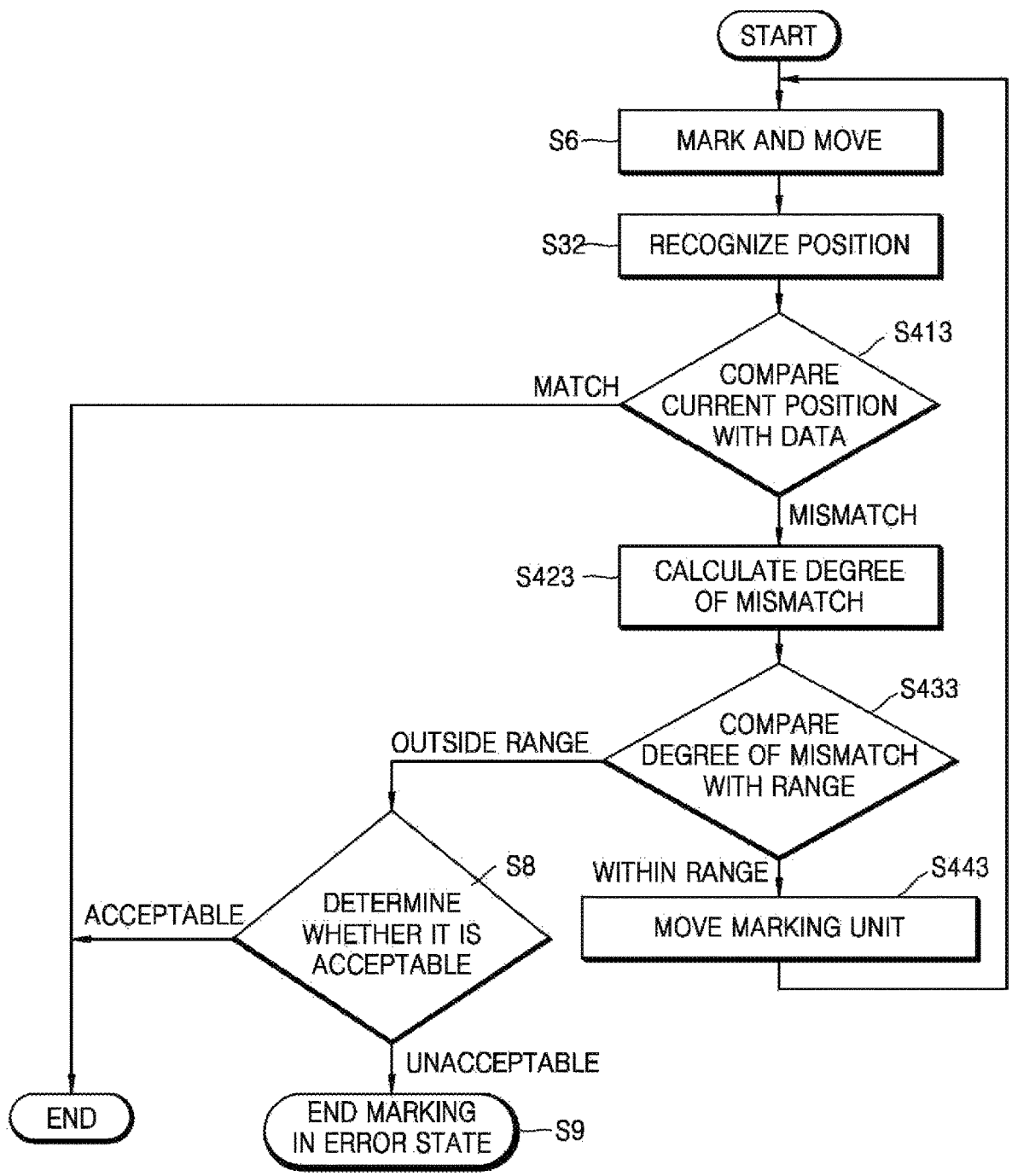
FIG. 14 is a block diagram illustrating another embodiment of the marking method performed by the nonrestrictive drive-type marking device of FIG. 1.

FIG. 14 is a block diagram illustrating another embodiment of the marking method performed by the nonrestrictive drive-type marking device of FIG. 1. Hereinafter, descriptions that are equal to those described with reference to FIGS. 9 and 12 are omitted or briefly provided.

Referring to FIGS. 1 and 14, the nonrestrictive drive-type marking device 10 detects a marking start point and then performs a marking while moving (S6).

The nonrestrictive drive-type marking device 10 recognizes a current position via the position detecting unit 12 (S32). The current position may be at least one of a first current position and a second current position.

The first control unit 15 and/or the second control unit 24 compares the recognized current position with original data (S413).

For example, the second control unit 24 may determine whether the current position matches with a marking end point. The marking end point refers to a second reference point at which the nonrestrictive drive-type marking device 10 stops the marking. That is, the marking end point may correspond to the second reference point indicating an end of the marking on a certain section from among a whole marking section to be marked by the nonrestrictive drive-type marking system. Thus, a plurality of a pair of a first reference point and the second reference point may be sequentially provided for the whole marking section. The marking end point may be a marking target point but the present disclosure is not limited thereto. The marking end point that is the marking target point, and the marking end point that is not the marking target point are distinguished therebetween by being referred to as a first marking end point and a second marking end point.

If the recognized current position matches with an end point on data, the first control unit 15 and/or the second control unit 24 ends the marking.

If the recognized current position does not match with the end point on the data, the first control unit 15 and/or the second control unit 24 calculates a degree of mismatch (S423), and determines whether the calculated degree of mismatch is within a preset error range (S433).

If the calculated degree of mismatch is within the preset error range, the second control unit 24 transmits a marking unit driving signal including data of the degree of mismatch to the first control unit 15 via the second communication unit 22 and the first communication unit 11, and the first control unit 15 moves at least a part of the marking unit 14 by the degree of mismatch (S443).

If the calculated degree of mismatch exceeds the preset error range, the first control unit 15 and/or the second control unit 24 may make a user determine whether to accept the degree of mismatch (S8).

If the user accepts the degree of mismatch, for example, if a user acceptance input with respect to a mismatch is received via the input unit 21, the first control unit 15 and/or the second control unit 24 ends the marking accordingly. However, if the user does not accept the degree of mismatch, for example, if a user disapproval input with respect to the mismatch is received via the input unit 21, the first control unit 15 and/or the second control unit 24 ends the marking in an error state (S9).

Although not illustrated in drawings, even if the current position does not match with the marking end point, when the degree of mismatch is within the preset error range, the first control unit 15 and/or the second control unit 24 may transmit a marking signal including a marking end command to the nonrestrictive drive-type marking device 10, thereby allowing the nonrestrictive drive-type marking device 10 to end the marking.

Although not illustrated in drawings, in the case where the marking is ended in an error state regardless of whether a worker can accept the degree of mismatch, the nonrestrictive drive-type marking system may provide information by which the worker may correct an error in a site. For example, the nonrestrictive drive-type marking system may perform a simulation by actually measuring a working space by driving the nonrestrictive drive-type marking device 10, may generate error information by comparing measurement data obtained therefrom with original data, and may display the generated error information on the original data.

In this regard, the nonrestrictive drive-type marking system determines first whether to perform the simulation, and if the simulation is not performed, the nonrestrictive drive-type marking system performs a marking as in the embodiments of FIGS. 10, 12, and/or 14.

On the other hand, if the simulation is performed, the marking is not performed and the projecting operation provided in the embodiments of FIGS. 10, 12, and/or 14 is performed.

While the nonrestrictive drive-type marking system performs the simulation, the nonrestrictive drive-type marking system compares the measurement data with the original data and may report the comparison to the worker, or may display the error information by displaying the measurement data on the original data.

According to another embodiment of the present disclosure, during the marking, the nonrestrictive drive-type marking system may compare the measurement data with the original data and may additionally mark the error information on a working surface.

When the sensing unit 121 of the position detecting unit 12 measures a distance of the working surface, the first control unit 15 and/or the second control unit 24 may control the marking to be performed by applying a user-desired scale based on a value of the measured distance. In this regard, if the working surface is slopped, a value of an actually-measured distance may be greater than a value of a distance on a drawing, and in this regard, the first control unit 15 and/or the second control unit 24 may correct a scale of the original data and may mark it on the working surface.

In the aforementioned embodiments of the present disclosure, as in FIG. 1, the remote control device 20 is separate from the nonrestrictive drive-type marking device 10 and controls driving of the nonrestrictive drive-type marking device 10, but the present disclosure is not limited thereto.

Figure 15:
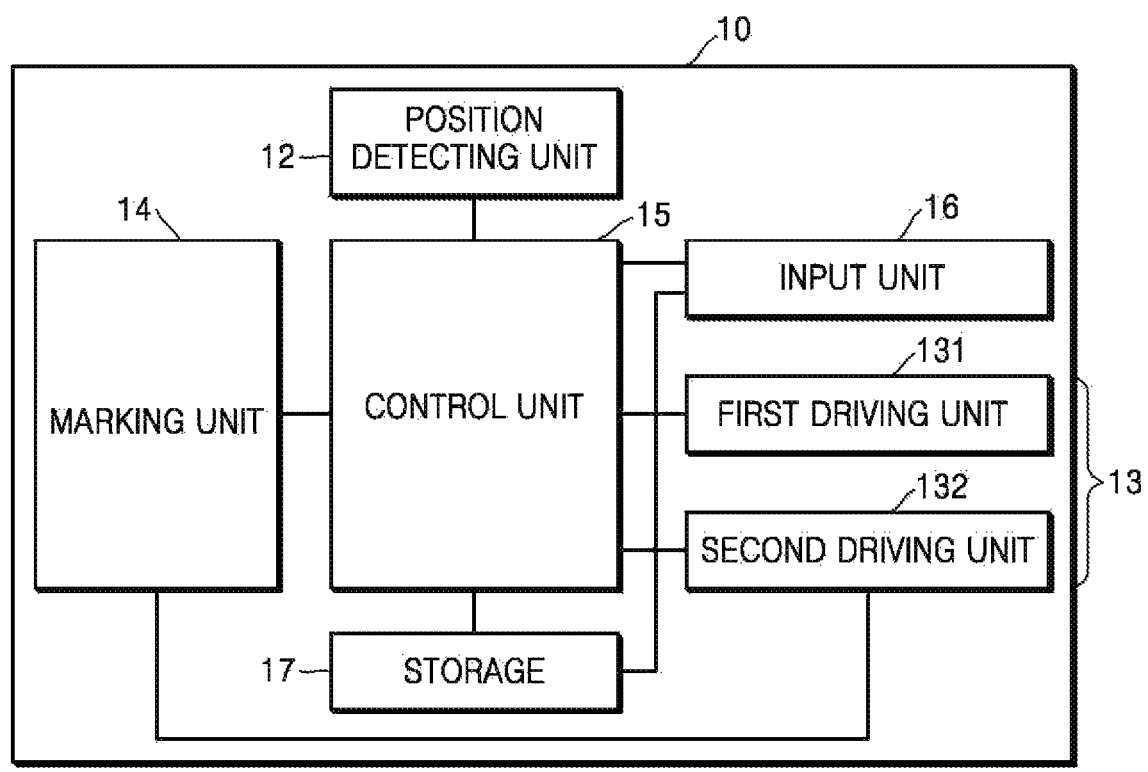
FIG. 15 is a configuration diagram of a nonrestrictive drive-type marking system, according to another embodiment of the present disclosure.

FIG. 15 is a configuration diagram of a nonrestrictive drive-type marking system, according to another embodiment of the present disclosure.

Referring to FIG. 15, the nonrestrictive drive-type marking device 10 may further include an input unit 16 and a storage 17 in addition to the position detecting unit 12, the driving unit 13, the marking unit 14, and the first control unit 15, and may directly receive an input of data and store the data.

According to an embodiment of the present disclosure, a plurality of the aforementioned nonrestrictive drive-type marking devices 10 may be connected in parallel so that multiple operations may be simultaneously performed.

The aforementioned embodiments of the present disclosure may be embodied as a computer program to be executed by using various components in computers, and the computer program may be recorded in a computer-readable medium. Examples of the medium include magnetic media including hard disks, floppy disks, and magnetic tapes, optical media including CD-ROMs and DVDs, magneto-optical media including floptical disks, and hardware device particularly designed to store and execute programmed commands in ROM, RAM, a flash memory, and the like. In addition, the medium may include an intangible medium implemented to be transmitted over network, and for example, the intangible medium may be software or an application implemented to be transmitted and distributed over network.

The computer program may be particularly designed and configured for the present disclosure or may be well known to one of ordinary skill in the art of computer software. Examples of the computer program include not only machine code generated by a compiler but also include a high-level programming language to be executed in a computer by using an interpreter.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

In the detailed description (in particular, in claims), the use of the term "the" and similar indicating terms may correspond to singular and plural forms. Also, when a range is described, the disclosure includes embodiments to which respective values in the range are applied (unless there is a particular description contrary thereto), and the detailed description of the disclosure may include the respective values in the range.

An order of operations performed by the methods according to the one or more embodiments of the present disclosure may be changed unless there is a particular description about the order of operations. Thus, the one or more embodiments are not limited to the order of operations. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art without departing from the spirit and scope of the present disclosure.

While the present disclosure has been particularly shown and described with reference to embodiments thereof, it will be understood by one of ordinary skill in the art that various changes and equivalent other embodiments may be made.

The invention claimed is:

1. A nonrestrictive drive-type marking system comprising a movable nonrestrictive drive-type marking device, the nonrestrictive drive-type marking system comprising:
   an input unit configured to receive data of content to be marked;
   a marking unit configured to mark the content corresponding to the data on a working surface;
   a driving unit configured to allow at least a part of the nonrestrictive drive-type marking device comprising the marking unit to nonrestrictively move on the working surface;
   a position detecting unit configured to generate position information of at least a part of the nonrestrictive drive-type marking device; and
   a control unit electrically connected to the input unit, the marking unit, the driving unit, and the position detecting unit, and configured to:
   calculate a current position of at least a part of the nonrestrictive drive-type marking device including the marking unit by comparing the position information with the data;
   compare the current position with the data;
   move at least a part of the marking unit when the current position does not match with the data and a degree of mismatch thereof is within a preset range;
   move at least a part of the nonrestrictive drive-type marking device when the current position does not match with the data and the degree of mismatch thereof exceeds the preset range; and
   control the nonrestrictive drive-type marking device when the current position matches with the data to mark the content corresponding to the data on the working surface.

2. The nonrestrictive drive-type marking system of claim 1, wherein the driving unit comprises:
   a first driving unit configured to move at least a part of the nonrestrictive drive-type marking device; and
   a second driving unit configured to move at least a part of the marking unit.

3. The nonrestrictive drive-type marking system of claim 2, wherein the control unit is further configured to move at least a part of the nonrestrictive drive-type marking device by driving the first driving unit, and when the current position does not match with the data and the degree of mismatch thereof is within the preset range, to move at least a part of the marking unit by driving the second driving unit.

4. The nonrestrictive drive-type marking system of claim 1, wherein the marking unit comprises:
 an ink supplying unit configured to supply ink; and
 a nozzle unit connected to the ink supplying unit and configured to spray the ink onto a marking target point.

5. The nonrestrictive drive-type marking system of claim 4, wherein the nozzle unit comprises:
 a first nozzle unit configured to perform marking in a first direction; and
 a second nozzle unit configured to perform marking in a second direction different from the first direction,
 wherein each of the first nozzle unit and the second nozzle unit comprises one or more nozzles.

6. The nonrestrictive drive-type marking system of claim 1, wherein the marking unit comprises a second marking unit configured to project the content corresponding to the data onto a portion of the working surface.

7. The nonrestrictive drive-type marking system of claim 1, wherein the marking unit comprises:
 a light irradiating unit configured to generate light; and
 an optical system connected to the light irradiating unit and configured to transmit the light to be irradiated to a marking target point.

8. The nonrestrictive drive-type marking system of claim 7, wherein the optical system comprises:
 a first optical element used for marking in a first direction; and
 a second optical element used for marking in a second direction different from the first direction,
 wherein each of the first optical element and the second optical element comprises one or more optical elements.

9. The nonrestrictive drive-type marking system of claim 1, wherein the marking unit comprises:
 a photosensitive agent supplying unit configured to supply a photosensitive agent;
 a spraying unit connected to the photosensitive agent supplying unit and configured to discharge the photosensitive agent to a marking target point;
 a light irradiating unit configured to generate light; and
 an optical system connected to the light irradiating unit and corresponding to the spraying unit, and configured to transmit the light to be irradiated to the marking target point.

10. The nonrestrictive drive-type marking system of claim 9, wherein the spraying unit comprises:
 a first spraying unit configured to perform marking in a first direction; and
 a second spraying unit configured to perform marking in a second direction different from the first direction,
 wherein the optical system comprises:
 a first optical element used for marking in the first direction; and
 a second optical element used for marking in the second direction, and
 wherein each of the first spraying unit and the second spraying unit comprises one or more spraying units, and each of the first optical element and the second optical element comprises one or more optical elements.

11. A nonrestrictive drive-type marking method comprising:
 inputting data of content to be marked into a nonrestrictive drive-type marking device that is movable, the nonrestrictive drive-type marking device comprising a position detecting unit, a control unit, a driving unit, and a marking unit;
 generating, by the position detecting unit, position information of at least a part of the nonrestrictive drive-type marking device;
 recognizing, by the control unit, a current position of at least a part of the nonrestrictive drive-type marking device by comparing the position information with the data, wherein the control unit is electrically connected to the position detecting unit;
 comparing, by the control unit, the current position with the data;
 when the current position matches with a marking start point of the data, controlling, by the control unit, operations of the driving unit and the marking unit to move the nonrestrictive drive-type marking device and to mark the content corresponding to the data on the working surface from the marking start point;
 when the current position does not match with the marking start point of the data and a degree of mismatch thereof is within a preset range, moving, by the control unit, at least a part of the marking unit; and
 when the current position does not match with the marking start point of the data and the degree of mismatch thereof exceeds the preset range, moving, by the control unit, at least a part of the nonrestrictive drive-type marking device.

12. The nonrestrictive drive-type marking method of claim 11, wherein:
 the generating, by the position detecting unit, of the position information comprises generating, by the position detecting unit, a first position signal with respect to at least a part of the marking unit;
 the recognizing, by the control unit, of the current position of at least a part of the nonrestrictive drive-type marking device comprises recognizing, by the control unit, a first current position based on the first position signal;
 the comparing, by the control unit, of the current position with the data comprises comparing, by the control unit, the first current position with a first marking start point;
 when the first current position matches with the first marking start point, the controlling, by the control unit, of the operations comprises controlling the marking to be performed;
 when the first current position does not match with the first marking start point, the controlling, by the control unit, of the operations comprises moving, by the control unit, at least a part of the marking unit to the first marking start point; and
 the first marking start point is a marking target point to be marked by the marking unit.

13. The nonrestrictive drive-type marking method of claim 12, wherein when the first current position does not match with the first marking start point, the controlling of the operations further comprises:
 calculating, by the control unit, a degree of mismatch between the first current position and the first marking start point;
 comparing, by the control unit, the calculated degree of mismatch with the preset range;
 when the calculated degree of mismatch is within the preset range, moving, by the control unit, at least a part of the marking unit to the first marking start point; and
 when the calculated degree of mismatch exceeds the preset range, moving, by the control unit, the nonrestrictive drive-type marking device to the first marking start point.

14. The nonrestrictive drive-type marking method of claim 11, wherein:

the generating, by the position detecting unit, of the position information comprises generating a second position signal with respect to at least a part of the nonrestrictive drive-type marking device which is not the marking unit;

the recognizing, by the control unit, of the current position of at least a part of the nonrestrictive drive-type marking device comprises, by the control unit, calculating a second current position based on the second position signal and calculating a first current position based on the second current position, wherein the first current position is the current position of at least a part of the marking unit;

the comparing, by the control unit, of the current position with the data comprises comparing, by the control unit, the second current position with a second marking start point;

the controlling of the operations comprises controlling, by the control unit, operations of the driving unit and the marking unit to mark the content corresponding to the data on the working surface when the second current position matches with the second marking start point, and moving, by the control unit, at least a part the marking unit to a first marking start point when the second current position does not match with the second marking start point; and the first marking start point is a marking target point to be marked by the marking unit, and the second marking start point is a marking start point that is not the marking target point.

15. The nonrestrictive drive-type marking method of claim 14, when the second current position does not match with the second marking start point, the controlling of the operations further comprises:

calculating, by the control unit, a degree of mismatch between the second current position and the second marking start point; and comparing, by the control unit, the calculated degree of mismatch with the preset range, wherein when the calculated degree of mismatch is within the preset range, the control unit moves at least a part of the marking unit to the first marking start point, and wherein when the calculated degree of mismatch exceeds the preset range, the control unit moves the nonrestrictive drive-type marking device to the second marking start point.

16. The nonrestrictive drive-type marking method of claim 11, further comprising ending, by the control unit, the marking at a marking end point.

17. The nonrestrictive drive-type marking method of claim 16, wherein the ending of the marking comprises ending, by the control unit, the marking when the current position matches with the marking end point, and wherein the nonrestrictive drive-type marking method further comprises:

when the current position does not match with the marking end point, determining, by the control unit, whether a degree of mismatch between the current position and the marking end point is within a preset range;

when the degree of mismatch between the current position and the marking end point is within the preset range, moving, by the control unit, the marking unit to the marking end point; and when the degree of mismatch between the current position and the marking end point exceeds the preset range, not moving, by the control unit, the marking unit to the marking end point.

18. The nonrestrictive drive-type marking method of claim 17, wherein the not moving, by the control unit, of the marking unit to the marking end point comprises:

ending, by the control unit, the marking when the degree of mismatch between the current position and the marking end point is acceptable; and ending, by the control unit, the marking in an error state when the degree of mismatch between the current position and the marking end point is unacceptable.

19. The nonrestrictive drive-type marking method of claim 11, further comprising performing, by the control unit, a simulation on the content to be marked by the nonrestrictive drive-type marking device while moving on the working surface.

20. The nonrestrictive drive-type marking system of claim 1, further comprising a remote control device comprising the input unit, wherein the nonrestrictive drive-type marking device comprises the marking unit, the driving unit, and the position detecting unit, wherein the control unit comprises a first control unit electrically connected to the marking unit, the driving unit, and the position detecting unit and positioned in the nonrestrictive drive-type marking device, and a second control unit electrically connected to the input unit and positioned in the remote control device, and wherein the nonrestrictive drive-type marking device and the remote control device are configured to communicate with each other.

\* \* \* \* \*